United States Patent
Sandbach

(10) Patent No.: US 6,492,980 B2
(45) Date of Patent: *Dec. 10, 2002

(54) MULTIPLEXING DETECTOR CONSTRUCTED FROM FABRIC

(75) Inventor: David L. Sandbach, London (GB)

(73) Assignee: Eleksen Limited, Iver Heath (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/907,810

(22) Filed: Jul. 19, 2001

(65) Prior Publication Data

US 2001/0043200 A1 Nov. 22, 2001

Related U.S. Application Data

(62) Division of application No. 09/298,172, filed on Apr. 23, 1999, now Pat. No. 6,369,804.

(30) Foreign Application Priority Data

| Sep. 26, 1998 | (GB) | 9820902 |
| Sep. 26, 1998 | (GB) | 9820905 |
| Sep. 26, 1998 | (GB) | 9820906 |
| Sep. 26, 1998 | (GB) | 9820908 |
| Sep. 26, 1998 | (GB) | 9820909 |
| Sep. 26, 1998 | (GB) | 9820910 |

(51) Int. Cl.$^7$ ................................................ G09G 5/00
(52) U.S. Cl. ................................... 345/173; 178/18.05
(58) Field of Search ............................... 345/173, 174; 178/18.01, 18.03, 18.05, 18.08

(56) References Cited

U.S. PATENT DOCUMENTS

| 3,911,215 A | 10/1975 | Hurst et al. |
| 4,220,815 A | 9/1980 | Gibson et al. |
| 4,435,616 A * | 3/1984 | Kley ............................ 178/18 |
| 4,503,286 A | 3/1985 | Kubo et al. |
| 4,659,873 A | 4/1987 | Gibson et al. |
| 4,687,885 A | 8/1987 | Talmage, Jr. et al. |
| 4,707,845 A | 11/1987 | Krein et al. |
| 4,795,998 A | 1/1989 | Dunbar et al. |
| 4,798,919 A | 1/1989 | Miessler et al. |
| 4,810,992 A | 3/1989 | Eventoff |
| 4,963,703 A | 10/1990 | Phillips et al. |
| 5,008,497 A | 4/1991 | Asher |
| 5,060,527 A | 10/1991 | Burgess |
| 5,159,159 A | 10/1992 | Asher |
| 5,262,778 A | 11/1993 | Saunders |
| 5,453,941 A | 9/1995 | Yoshikawa |
| 5,565,657 A | 10/1996 | Merz |
| 5,686,705 A | 11/1997 | Conroy et al. |
| 5,815,139 A | 9/1998 | Yoshikawa et al. |
| 5,852,260 A | 12/1998 | Yoshikawa |

FOREIGN PATENT DOCUMENTS

| EP | 0032013 A1 | 7/1981 |
| EP | 0054406 A1 | 6/1982 |
| EP | 0161895 | 11/1985 |
| EP | 0172783 A2 | 2/1986 |
| EP | 0261770 A2 | 3/1986 |
| EP | 0855307 A2 | 7/1998 |
| EP | 1100044 A1 | 5/2001 |
| GB | 1308575 | 2/1973 |
| GB | 2148190 | 4/1973 |
| GB | 1331942 | 9/1973 |
| GB | 2115555 A | 9/1983 |
| GB | 2341932 A | 9/1999 |
| GB | 2341978 A | 9/1999 |
| GB | 2341929 | 3/2000 |

OTHER PUBLICATIONS

Patent Abstracts of Japan, 61231626, Oct. 15, 1986, Asahi Chem Ind Co Ltd.
Patent Abstracts of Japan, 03254083, Nov. 13, 1991, Fujiyoshi Katsusato.

* cited by examiner

Primary Examiner—Regina Liang
(74) Attorney, Agent, or Firm—Nixon & Vanderhye PC

(57) ABSTRACT

A position detector is constructed from fabric and has electrically conductive elements. The detector is configured to produce electrical outputs in response to mechanical interactions, and is divided into several regions. Each of the regions includes a first conducting plane and a second conducting plane configured such that, in use, a mechanical interaction results in conducting planes of at least one of said regions being brought closer together. A potential is applied across at least one of said planes to determine the position of said mechanical interaction.

21 Claims, 19 Drawing Sheets

MULTIPLEXING DETECTOR CONSTRUCTED FROM FABRIC

RELATED APPLICATION

This is a division of my commonly assigned application 09/298,172 filed Apr. 23, 1999 now U.S. Pat. No. 6,369,804.

FIELD OF THE INVENTION

The present invention relates to a detector constructed from fabric having electrically conductive elements to define at least two electrically conductive planes.

INTRODUCTION TO THE INVENTION

A fabric touch sensor for providing positional information is described in U.S. Pat. No. 4,659,873 of Gibson. The sensor is fabricated using at least one resistive fabric layer in the form of conducting threads. This fabric is constructed using either uni-directional threads or crossed threads formed by overlaying one set with another or weaving the two sets together. The fabric is separated from a second resistive layer to prevent unintentional contact by separators in the form of non-conducting threads, insulator dots or with an air gap. Both resistive layers are fabrics formed from conductive threads such that no pre-forming is required in order to adapt the sensor to a contoured object.

A problem with the sensor described in the aforesaid United States patent is that it is only capable of identifying the location of the mechanical interaction and cannot provide additional information about the interaction.

A touch sensor for providing positional information is described in U.S. Pat. No. 4,487,885 of Talmage, which also provides a signal dependent upon the pressure or force applied. However, the sensor described is made from a printed circuit board and a flexible sheet of rubber, elastomer or plastic and as such it does not have the many physical qualities that a fabric may provide.

SUMMARY OF THE INVENTION

According to a first aspect of the present invention, there is provided a position detector constructed from fabric having electrically conductive elements, comprising at least two electrically conducting planes, wherein an electric potential is applied across at least one of said planes to determine the position of a mechanical interaction; and a second electrical property is determined to identify additional properties of said mechanical interaction.

In a preferred embodiment, the position detector is configured to measure current or resistance as said second electrical property. Furthermore, applied force, applied pressure, area of contact or orientation of an object may be determined as the additional property of mechanical interactions.

In a preferred embodiment, the detector interacts mechanically with parts of a human body; a first electrical property determines the position of a mechanical interaction and a second electrical property determines the area of coverage.

According to a second aspect of the present invention, there is provided a method of detection, performed with respect to a detector constructed from fabric and having electrically conductive elements configured to provide at least two electrically conducting planes, comprising the steps of applying a potential across at least one of said planes to determine the position of a mechanical interaction, and measuring a second electrical property to identify additional properties of said mechanical interactions.

According to a third aspect of the present invention, there is provided a detector constructed from fabric having electrically conductive elements and configured to produce electrical outputs in response to mechanical interactions, wherein said detector is divided into a plurality of regions; each of said regions includes a first conducting plane and a second conducting plane; a mechanical interaction results in conducting planes of at least one of said regions being brought closer together; and a potential is applied across at least one of said planes to determine the position of said mechanical interaction.

According to a fourth aspect of the present invention, there is provided a detector constructed from fabric having electrically conductive elements to define at least two electrically conducting planes and configured to produce an electrical output in response to a mechanical interaction, wherein a potential is applied across at least one of said planes to determine the position of a mechanical interaction and said second electrical property is determined to identify additional properties of said mechanical interactions; and a conductivity non-uniformity is included in at least one of said planes so as to modify an electrical response to a mechanical interaction.

In a preferred embodiment, the conductivity non-uniformity includes a co-operating pair of conducting strips configured to generate a substantially linear electric field within the conducting planes. Preferably, the strips are applied to each of the conducting planes at orthogonal locations.

According to an alternative preferred embodiment, all edges of the conducting planes are modified. The conductivity non-uniformity may be defined by adjusting the density of conducting threads or it may be created by printing conductive materials onto the detector.

DETAILED DESCRIPTION OF THE PREFERRED EMBODIMENTS

The invention will now be described by way of example only with reference to the previously identified drawings.

Figure 1:
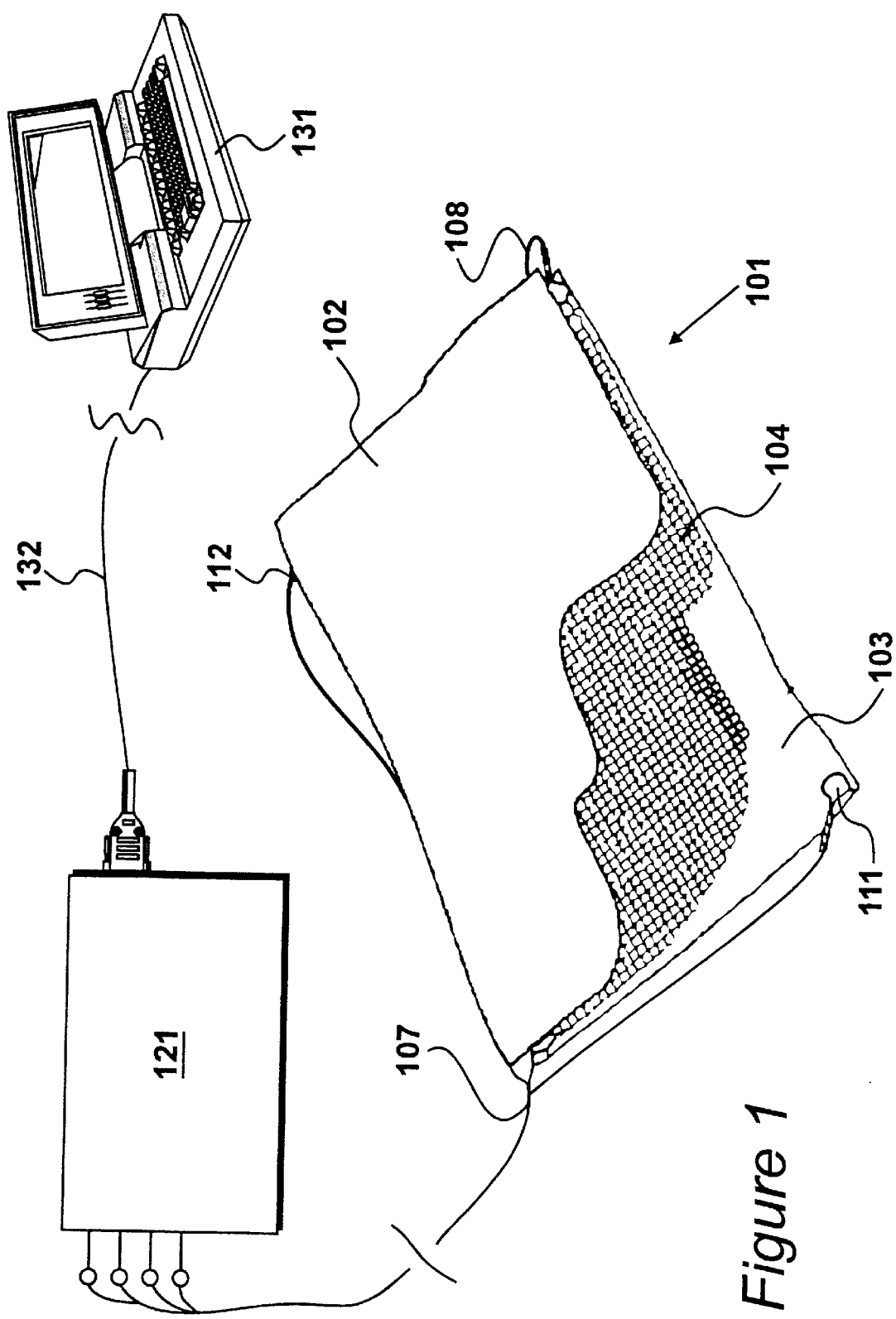
FIG. 1 shows a position detector constructed from fabric.

A position detector 101 constructed from fabric is shown in FIG. 1. The detector has two electrically conducting fabric planes, in the form of a first plane 102 and a second plane 103. The planes are separated from each other and thereby electrically insulated from each other, by means of an insulating mesh 104. When force is applied to one of the planes, the two conducting planes are brought together, through the mesh 104, thereby creating a position at which electrical current may conduct between planes 102 and 103. In this way, it is possible to identify the occurrence and/or position of a mechanical interaction.

The fabric planes are defined by fabric structures, which may be considered as a woven, non-woven (felted) or knitted etc. The fabric layers may be manufactured separately and then combined to form the detector or the composite may be created as part of the mechanical construction process.

When a voltage is applied across terminals 107 and 108, a voltage gradient appears over plane 102. When a mechanical interaction takes place, plane 103 is brought into electrical contact with plane 102 and the actual voltage applied to plane 103 will depend upon the position of the interaction. Similarly when a voltage is applied between connectors 111 and 112, a voltage gradient will appear across plane 103 and mechanical interaction will result in a voltage being applied to plane 102. Similarly, the actual voltage applied to plane 102 will depend upon the actual position of the interaction. In this way, for a particular mechanical interaction, it is possible to identify locations within the plane with reference to the two aforesaid measurements. Thus, connectors 107, 108, 111 and 112 are received by a control circuit 121, configured to apply voltage potentials to the detector 101 and to make measurements of electrical properties in response to mechanical interactions.

Control circuit 121 identifies electrical characteristics of the sensor 101 and in response to these calculations, data relating to the characteristics of the environment are supplied to a data processing system, such as a portable computer 131, via a conventional serial interface 132.

Figure 2:
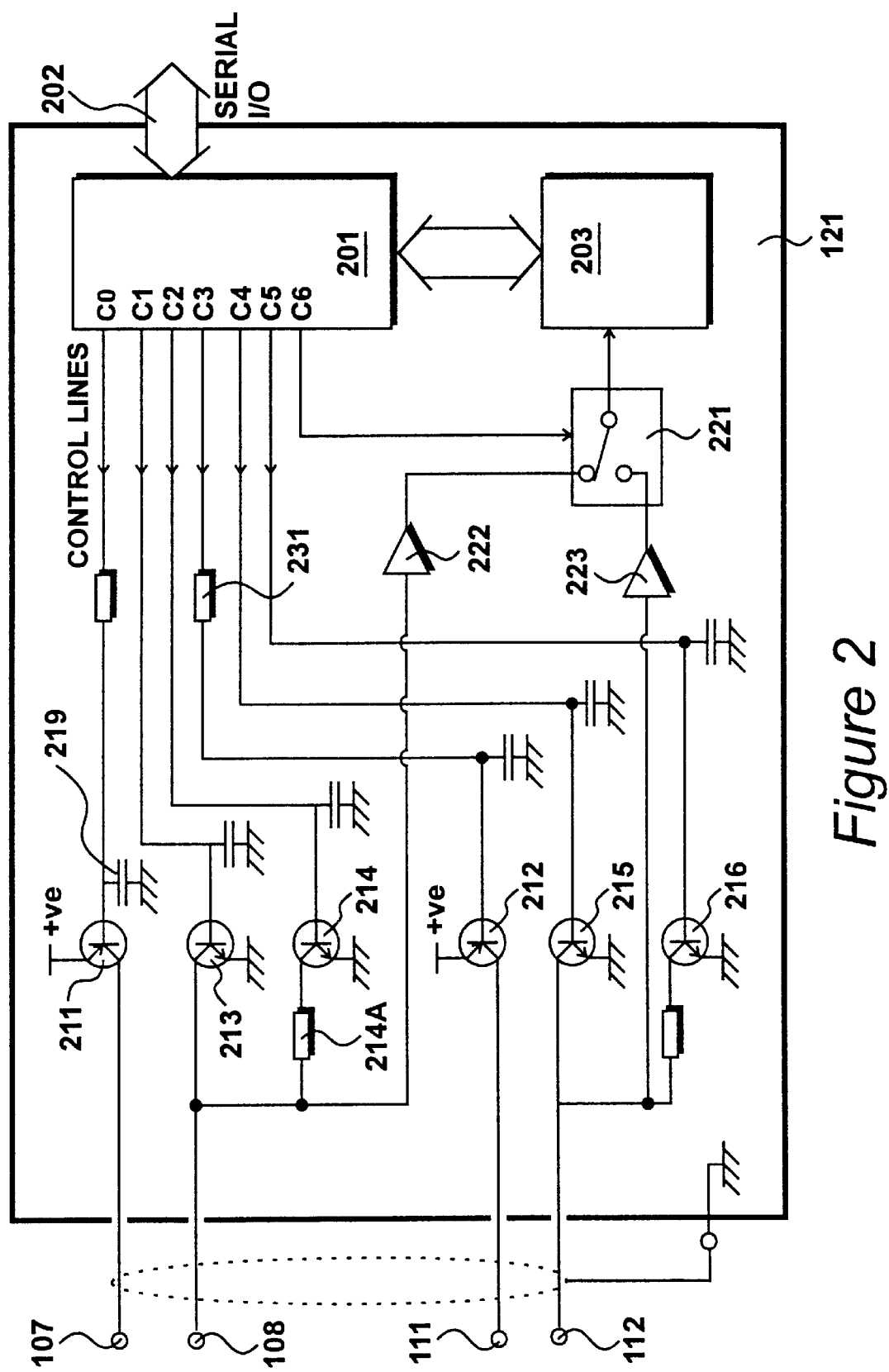
FIG. 2 shows a control circuit identified in FIG. 1.

Control circuit 121 is detailed in FIG. 2. The control circuit includes a micro-controller 201 such as a Philips 80C51 running at a clock frequency of twenty megahertz. Operations performed by micro-controller 201 are effected in response to internally stored commands held by an internal two kilobyte read-only memory. The micro-controller also includes one hundred and twenty-eight bytes of randomly accessible memory to facilitate intermediate storage while performing calculations. Micro-controller 201 includes a serial interface 202 in addition to assignable pins and an interface for communicating with an analogue to digital converter 203, arranged to convert input voltages into digital signals processable by the micro-controller 201.

The control circuit 121 includes two PNP transistors 211 and 212, in addition to four NPN transistors 213, 214, 215 and 216. All of the transistors are of relatively general purpose construction and control switching operations within the control circuit so as to control the application of voltages to the position detector 101.

In operation, measurements are made while a voltage is applied across first plane 102 and then additional measurements are made while a voltage is applied across the second plane 103; and output voltage only being applied to one of the planes at any particular time. When an output voltage is applied to one of the planes, plane 102 or plane 103, input signals are received from the co-operating plane 103 or 102 respectively. Input signals are received by the analogue to digital converter 203 via a selection switch 221, implemented as a CMOS switch, in response to a control signal received from pin C6 of the micro-controller 201. Thus, in its orientation shown in FIG. 2, switch 221 has been placed in a condition to receive an output from a first high impedance buffer 222, buffering an input signal received from plane 102. Similarly, when switch 221 is placed in its alternative condition, an input is received from a second high impedance buffer 223, configured to receive an input signal from plane 103. By placing buffers 222 and 223 on the input side of CMOS switch 221, the switch is isolated from high voltage electrostatic discharges which may be generated in many conditions where the detector undergoes mechanical interactions.

In the condition shown in FIG. 2, switch 221 is placed in its upper condition, receiving input signals from buffer 222, with output signals being supplied to the second plane 103. Further operation will be described with respect to this mode of operation and it should be appreciated that the roles of the transistor circuitry are reversed when switch 221 is placed in its alternative condition. As previously stated, condition selection is determined by an output signal from pin C6 of micro-controller 201. In its present condition the output from pin C6 is low and switch 221 is placed in its alternative configuration when the output from pin 6 is high.

Output pin C0 controls the conductivity of transistor 211 with pins C1 to C5 having similar conductivity control upon transistors 213, 214, 212, 215 and 216 respectively.

Transistors 211 and 213 are switched on when a voltage is being applied to the first plane 102 and are switched off when a voltage is being applied to the second plane 103. Similarly, when a voltage is being applied to the second plane 103, transistors 212 and 215 are switched on with transistors 211 and 213 being switched off. In the configuration shown in FIG. 2, with switch 221 receiving an input from buffer 222, output transistors 211 and 213 are switched off with output transistors 212 and 215 being switched on. This is achieved by output pin C0 being placed in a high condition and pin C1 being placed in a low condition. Similarly, pin C3 is placed in a low condition and pin C4 is placed in a high condition.

In the configuration shown, C3 is placed in a low condition, as previously described. The micro-controller 201 includes a pull-down transistor arranged to sink current from the base of transistor 212, resulting in transistor 212 being switched on to saturation. Consequently, transistor 212 appears as having a very low resistance, thereby placing terminal 111 at the supply voltage of five volts. Resistor 231 (4K7) limits the flow of current out of the micro-controller 201, thereby preventing burn-out of the micro-controller's output transistor.

Pin C4 is placed in a high state, resulting in transistor 215 being placed in a conducting condition. A serial resistor is not required given that the micro-controller 201 includes internal pull-up resistors, as distinct from a pull-up transistor, such that current flow is restricted. Thus, transistors 212 and 215 are both rendered conductive, resulting in terminal 111 being placed at the positive supply rail voltage and terminal 112 being placed at ground voltage. The capacitors shown in the circuit, such as capacitor 219, limit the rate of transistor transitions thereby reducing rf transmissions from the sensor 101.

With transistors 212 and 215 placed in their conductive condition, input signals are received from the first plane 102 in the form of a voltage applied to terminal 108. For position detection, this voltage is measured directly and transistor 214 is placed in a non-conductive condition by output pin C2 being placed in a low condition. Under these conditions, the voltage from input terminal 108 is applied to analogue to digital converter 203 via buffer 222 and switch 221.

In accordance with the present invention, a second electrical property is determined which, in this embodiment, represents the current flowing through the sensor in response to a mechanical interaction. The current measurement is made by placing transistor 214 in a conductive condition, by placing output pin C2 in a high condition. In this condition, current received at terminal 108 is supplied to transistor 214 via resistor 214A, having a resistance of typically 5k selectable so as to correspond to the characteristics of the sensor. A voltage is supplied to A to D converter 203 via buffer 222 and switch 221 but on this occasion the voltage represents a voltage drop, and hence a current, across resistor 214A.

Thus, transistors 212 and 215 are placed in a conducting condition, transistor 214 is placed in a non-conducting condition, so as to measure voltage, and is then placed in a conducting condition so as to measure current. The roles of the transistors are then reversed, such that output transistors 211 and 213 are placed in a conducting condition, with transistors 212 and 215 being placed in a non-conducting condition (and switch 221 reversed) allowing a voltage to be measured by placing transistor 216 in a non-conducting condition, and then allowing a current to be measured by placing transistor 216 in a conducting condition.

The cycling of line conditions, in order to make the measurements identified previously, is controlled by a clock resident within micro-controller 201. After each condition has been set up, a twelve bit number is received from the digital to analogue converter 203 and this number is retained within a respective register within micro-controller 201. Thus, after completing a cycle of four measurements, four twelve bit values are stored within the micro-controller 201 for interrogation by the processing device 131. Furthermore, the rate of cycling may be controlled in response to instructions received from the processing device 131.

Figure 3:
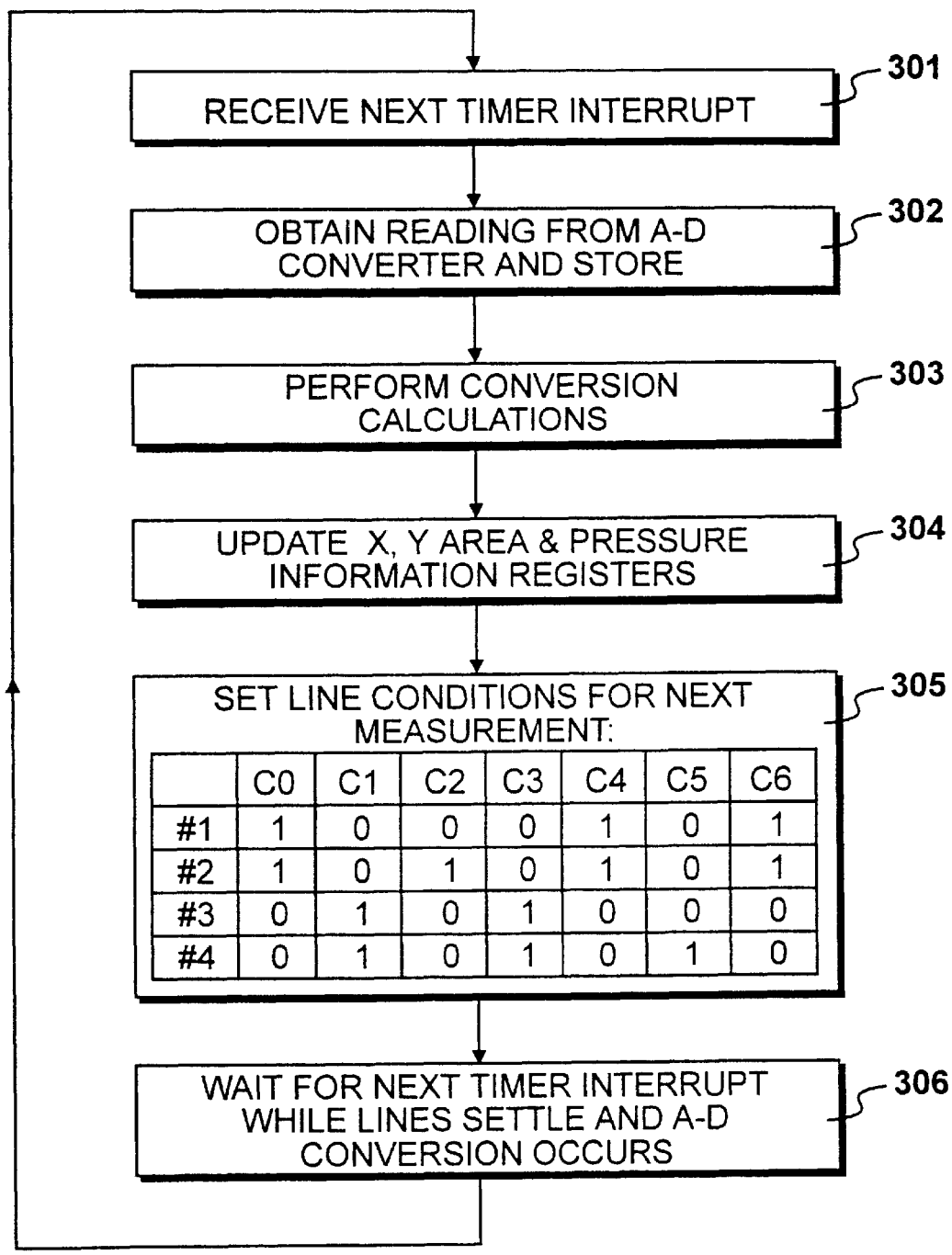
FIG. 3 details operations performed by the microcontroller identified in FIG. 2.

Operations performed by micro-controller 201 are detailed in FIG. 3. The micro-controller continually cycles between its four configuration states and each time a new input is produced, representing a current or a voltage in one of the two configurations, new output data is calculated on an on-going basis. Thus, output registers are updated such that the best data is made available if the micro-controller is interrupted by the external processor 131.

The micro-controller 201 is fully interrupt driven in terms of receiving external interrupts for data interrogation along with internal interrupts in order to initiate a configuration cycle. The external interrupt has a higher priority such that external processor 131 is provided with information as soon as possible in response to making an interrupt request.

Internally interrupts for the micro-controller 201 are generated by its own internal timer and the procedure shown in FIG. 3 is effectively held in a wait state until a next timer interrupt is received at step 301. The wait state allows voltage levels on connections 107, 108, 111 and 112 to become stable and provides sufficient time for valid data to be received from the analogue to digital converter 203.

At step 302, an output is received from analogue to digital converter 203 and at step 303 calculations are performed with respect to the most current data received from the analogue to digital converter, so as to convert numerical values relating to voltages and currents into numerical values representing properties of the mechanical interaction. Thus, after performing calculations at step 303, appropriate registers are updated at step 304 and it is these registers that are interrogated in response to an interrupt received from processing system 131.

At step 305 next conditions for the output lines are set by appropriate logic levels being established for output pins C0 to C6. After the next output condition has been selected, the processor enters a wait state at step 306, allowing the electrical characteristics to settle, whereafter processing continues in response to the next timer interrupt.

Thus, it should be appreciated that on each iteration of the procedure shown in FIG. 3, one of the output conditions is selected at step 305. Thus, it should be appreciated that the input data is effectively delayed and does not represent a condition of the electrical characteristics at an instant. If in practice, the delay between measurements becomes too large, it becomes necessary to enhance the frequency of operation of circuits within the control system shown in FIG. 2. Thus, the rate of conversion for converter 203 would need to be increased and the circuitry would need to be redesigned for high frequency operation. This in turn could create problems in terms of high frequency interference resulting in enhanced shielding being required for the facility as a whole.

When output condition number one is selected, an output voltage at 108 is determined. On the next cycle, identified as output condition number two, the current flowing through connector 108 is determined. On the next iteration, under output configuration number three, the voltage appearing at connector 112 is determined and on the next cycle, identified as condition number four, the current flowing through connector 112 is determined. After each of these individual measurements, new data is generated in response to steps 303 and 304 such that resulting output registers are being regularly updated on a continual basis, such that the processing system 131 may effectively perform a continual monitoring operation in terms of changes made to the mechanical interactions with the detector 101.

In a typical implementation, the four characteristic measurements, making up a complete cycle, will be repeated at a frequency of between twenty-five to fifty times per second. In situations where such a repetition rate is not required, it may be preferable to increase the duration of the wait states and thereby significantly reduce overall power consumption.

Figure 4:
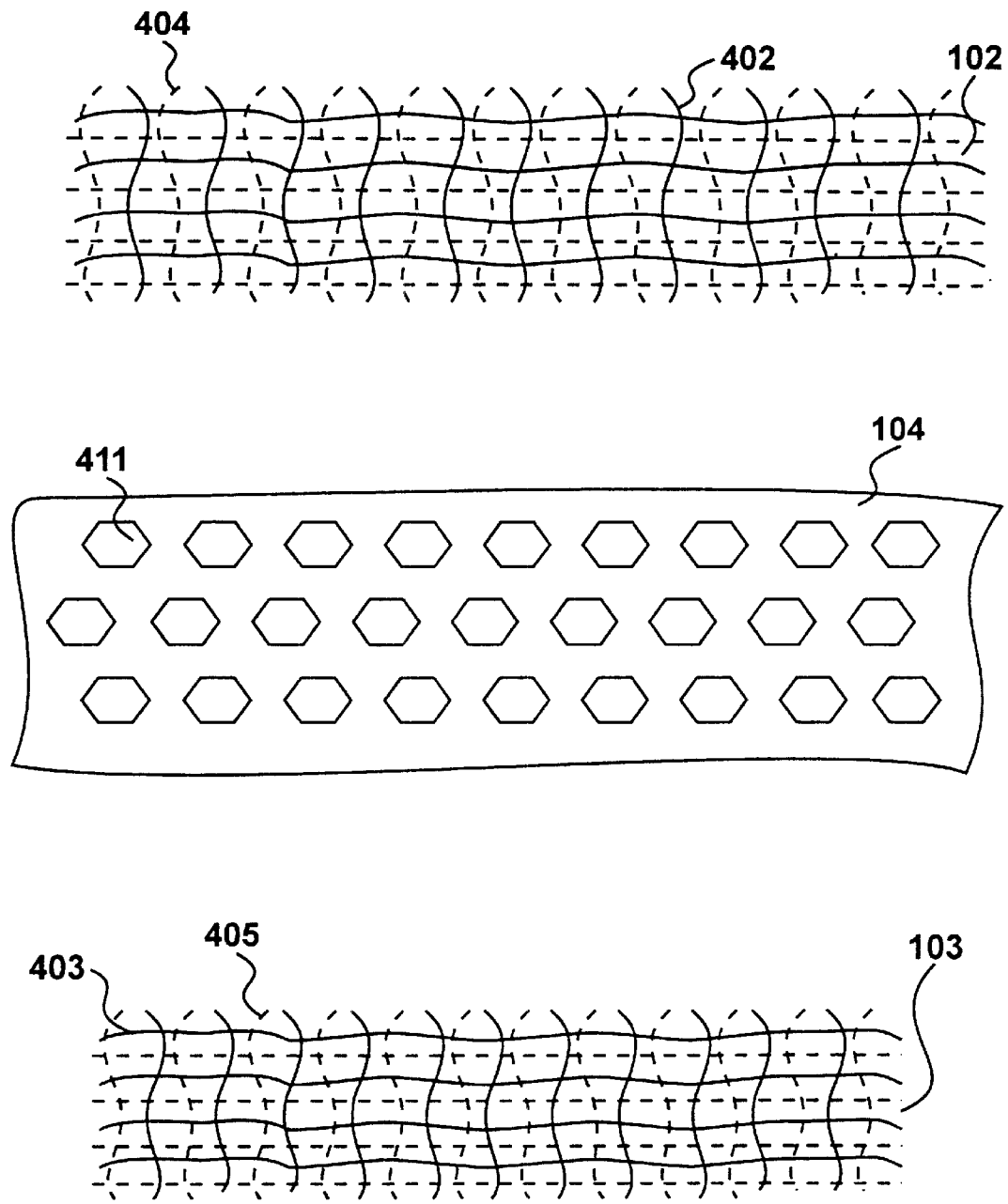
FIG. 4 details planes identified in FIG. 1.

Planes 102, 103 and 104 of the detector 101 are detailed in FIG. 4. Planes 102 and 103 are of substantially similar construction and are constructed from fabric having electrically conductive elements 402 in plane 102 along with similar electrical conductive elements 403 in plane 103. Thus, it is possible for a voltage indicative of position to be determined when conductive elements 402 are placed in physical contact with conductive elements 403.

The overall resistivity of planes 102 and 103 are controlled by the inclusion of non-conducting elements 404 and

405. Thus, resistivity is controlled by controlling the relative quantities and/or densities of conductive elements 402 with non-conductive elements 404. Resistivity may also be controlled by selecting an appropriate fibre type, adjusting the thickness of the fibre or adjusting the number of strands present in a yarn.

Plane 104 represents a non-conducting insulating spacer positioned between the two conducting planes 102 and 103. Plane 104 is constructed as a moulded or woven nylon sheet having an array of substantially hexagonal holes 411, the size of holes 411 is chosen so as to control the ease with which it is possible to bring conductive elements 402 into physical contact with conductive elements 403. Thus, if relatively small holes 411 are chosen, a greater force is required in order to bring the conductive elements together. Similarly, if the size of the hole is increased, less force is required in order to achieve the conductive effect. Thus, the size of holes 411 would be chosen so as to provide optimal operating conditions for a particular application. Operating conditions may also be adjusted by controlling the thickness of layer 104, its surface flexibility and the contour of co-operating planes 102 and 103.

When a potential is applied across one of the conducting planes, the actual potential detected at a point on that plane will be related to the position at which the measurement is made. Thus, a direct voltage measurement from the co-operating plane gives a value from which a positional co-ordinate may be determined. By reversing the role of the planes and taking a measurement from the opposing plane, two co-ordinates are obtained from which it is then possible to identify a precise location over the planar surface.

In addition to measuring position on the planar surface, the present invention is directed at identifying additional electrical properties in order to determine properties of the mechanical interaction. As previously described, the system is configured to measure currents in addition to measuring voltages.

Figure 5:
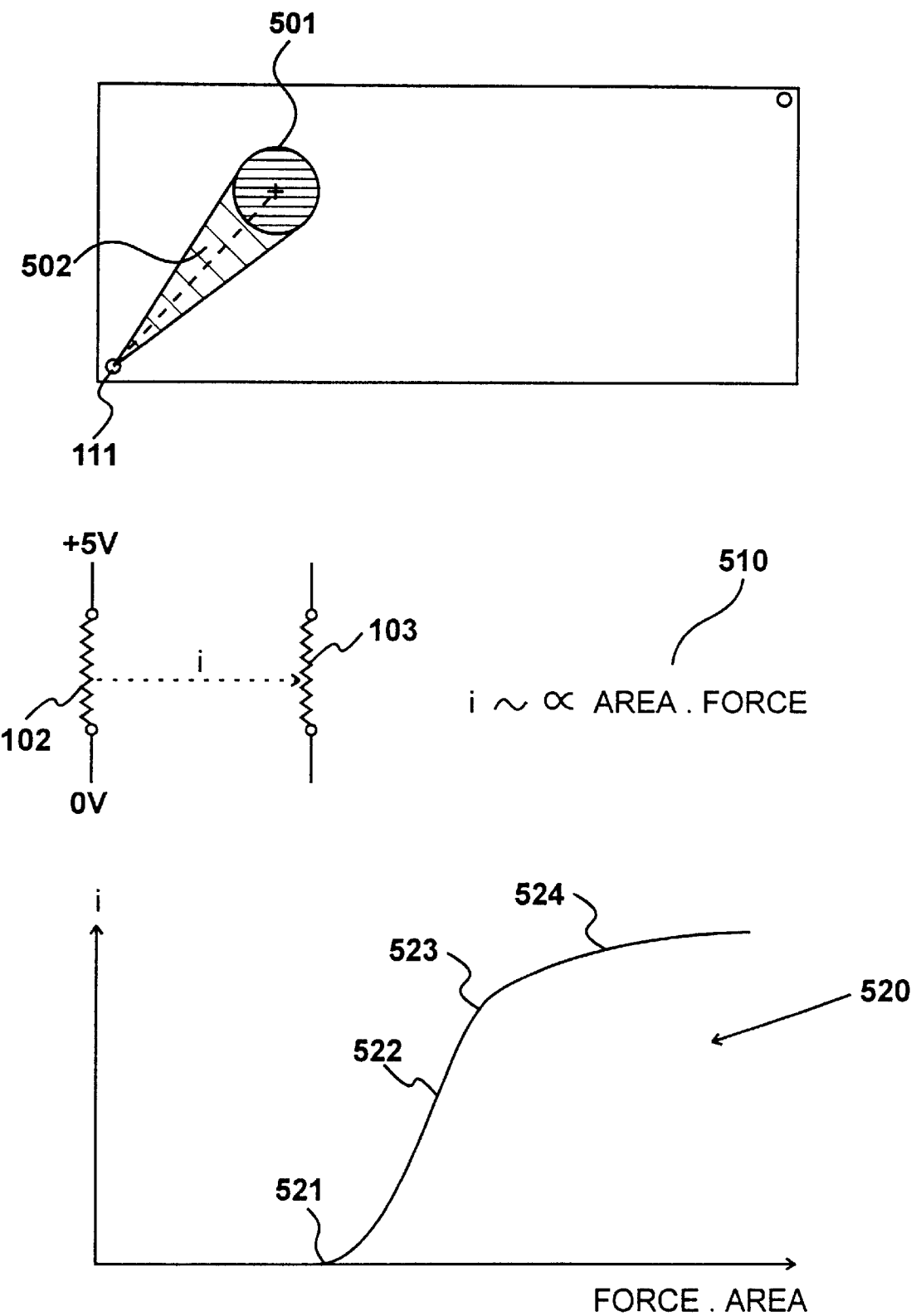
FIG. 5 details current flow due to mechanical interaction.

When the two conducting planes are brought into mechanical contact, due to a mechanical interaction, the amount of current flowing as a result of this contact will vary in dependence upon the actual position of the plane where the mechanical interaction takes place. The position of the mechanical interaction has also been determined with reference to voltages and it could be expected that these two quantities will vary in a substantially similar way, each representing the same physical situation. Experience has shown that variations in measured current do not follow exactly the same characteristic as variations in measured voltage. As illustrated in FIG. 5, the amount of current flowing due to a mechanical interaction will depend upon the position of a mechanical interaction 501. However, in addition to this, the amount of current flow will also depend upon the size of the mechanical interaction. As the size of the mechanical interaction increases, there is a greater area of contact and as such the overall resistance of the mechanical interaction is reduced. However, it should be appreciated that variations in terms of current with respect to interaction size is a sophisticated relationship, given that, in addition to the resistivity of the contact area 501, the resistivity of the actual electrical connections within the sheet must also be taken into account.

Thus, current is transmitted through a region 502 in order to provide a current to the contact region 501. Some aspects of this effect will be compensated with reference to position calculations and other variations due to this effect may be compensated by a non-linear analysis of the input data.

Contact area resistivity is illustrated generally at 510 and shows that the amount of current flowing between plane 102 and plane 103 is considered as being related to the area of mechanical interaction, which is related to the area of contact externally and to the level of externally applied mechanical force.

The resulting non-linear relationship between the force area product and the resulting current flow is illustrated generally at 520. At 521 there is an initial threshold point, identifying the point at which the gap starts to be closed, followed by an operational part of the curve 522 which may give useful indications of pressure up to point 523, whereafter the relationship becomes very non-linear until position 524 where the relationship effectively saturates.

Using a detector of the type illustrated in FIG. 1, it is possible to measure current flow, which could also be considered as contact resistance, in order to identify an additional mechanical property of the interaction. As illustrated in FIG. 5, this other mechanical property is related to the area of contact between the sheets, determined by the amount of force applied to the sheets, and to the total area over which the force is applied; or a combination of these two properties. Thus, data relating to force and area may give useful information relating to the interaction, separate from the position at which the interaction takes place.

In some situations, such as when using a stylus or similar implement, the area of applied force remains substantially constant therefore a measurement of current will enable calculations to be made in terms of stylus pressure. Pressure sensitive styli are known but in known configurations the pressure detection is determined within the stylus itself, leading to the stylus being mechanically connected to operational equipment or requiring sophisticated wireless transmission within the stylus itself. The present embodiment allows stylus pressure to be determined using any non-sophisticated stylus, given that the pressure detection is made by the co-operating fabric detector, arranged to detect stylus position (with reference to voltage) in combination with stylus pressure, with reference to current.

An alternative construction for the conducting fabric planes is illustrated in FIGS. 6A–6D. The detector includes a first conducting plane 601 and a second conducting plane 602. In addition, woven into each of the conducting planes 601 and 602, there are a plurality of non-conducting nodes 605 arranged to mutually interfere and thereby separate the two conducting planes. Between the nodes, the fabrics of the first and second planes may be brought into contact relatively easily such that the application of force, illustrated by arrow 611 (FIG. 6B) would tend to cause a finite number of regions interspersed between nodes 605 to be brought into contact. Thus, for a particular region, contact either is taking place or is not taking place as illustrated by curve 621 (FIG. 6C).

With a number of such regions brought into contact, the overall level of current flow will tend to vary with the area of contact as illustrated by curve 631 (FIG. 6D). Thus, using a construction of the type shown in FIG. 6A, it is possible to obtain a more linear relationship, compared to that shown in FIG. 5, in which the level of current flow gives a very good indication of the area of coverage as distinct from the level of force applied to the mechanical interaction.

Given a construction of the type shown in FIG. 6A, an indication of applied force or pressure may be obtained, in addition to an accurate determination of area, by providing an incremental switching operation. In the configuration shown in FIG. 7, there is provided a first conducting plane 701 which interacts with a second conducting plane 702. Furthermore, conducting plane 702 interacts with a third conducting plane 704. Conducting plane 701 is separated from conducting plane 702 by non-conducting portions 705. Similarly, plane 702 is separated from plane 704 by non-conducting portions 706. More non-conducting portions 706 are provided than similar non-conducting portions 705. Consequently, less force is required to produce electrical contact between planes 701 and 702 than is required to produce an electrical contact between planes 702 and 704. In this way, it is possible to provide an incremental measurement of force, given that a low force will only cause contact between plane 701 and plane 702 whereas a larger force will also provide electrical contact between plane 702 and 704.

An alternative configuration is shown in FIG. 8A in which it is possible to obtain enhanced substantially continuous variations in current flow with respect to applied force. A first conducting plane 801 interacts with a second conducting plane 802. The planes are woven in such a way as to produce very uneven surfaces such that, under light load, the level of interaction is relatively low. As load increases, as illustrated generally at 805 (FIG. 8B), a greater level of surface contact shown at 806 is created thereby increasing the level of current flow in a substantially continuous way. It should also be noted that this configuration does not include an insulating layer as such and that a level of current flow will always take place even under conditions of zero load. Alternatively, a very thin insulating layer could be provided, having a relatively low threshold, thereby resulting in a zero current flow when no load is applied.

As shown by curve 811 (FIG. 8C), the output current varies with respect to variations in applied force for a constant load area. Similarly, as shown by curve 821 (FIG. 8D), output current varies with respect to load area for a substantially constant applied force.

Figure 6:
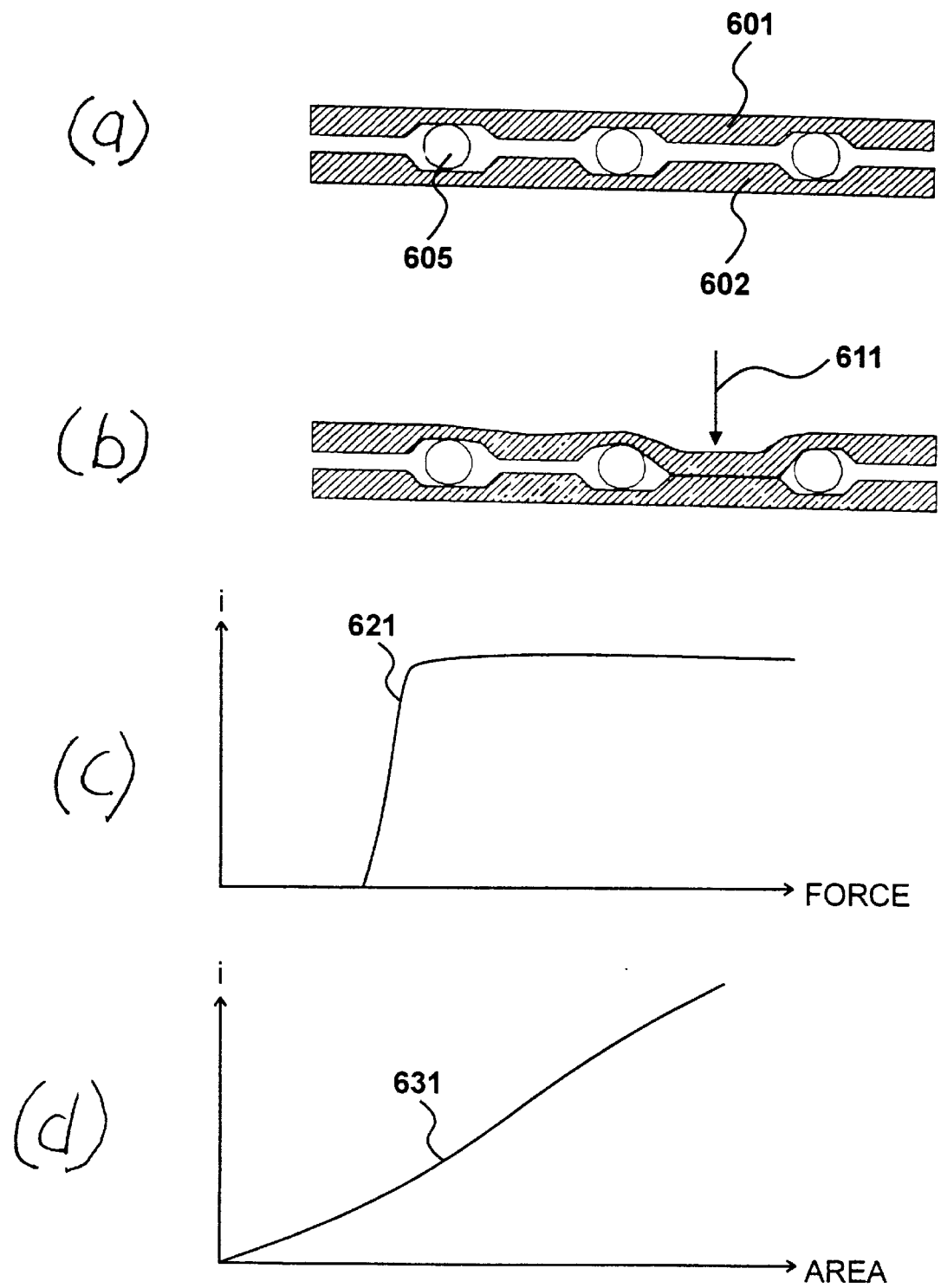
FIGS. 6A–6D detail an alternative construction for conducting fabric planes.
Figure 7:
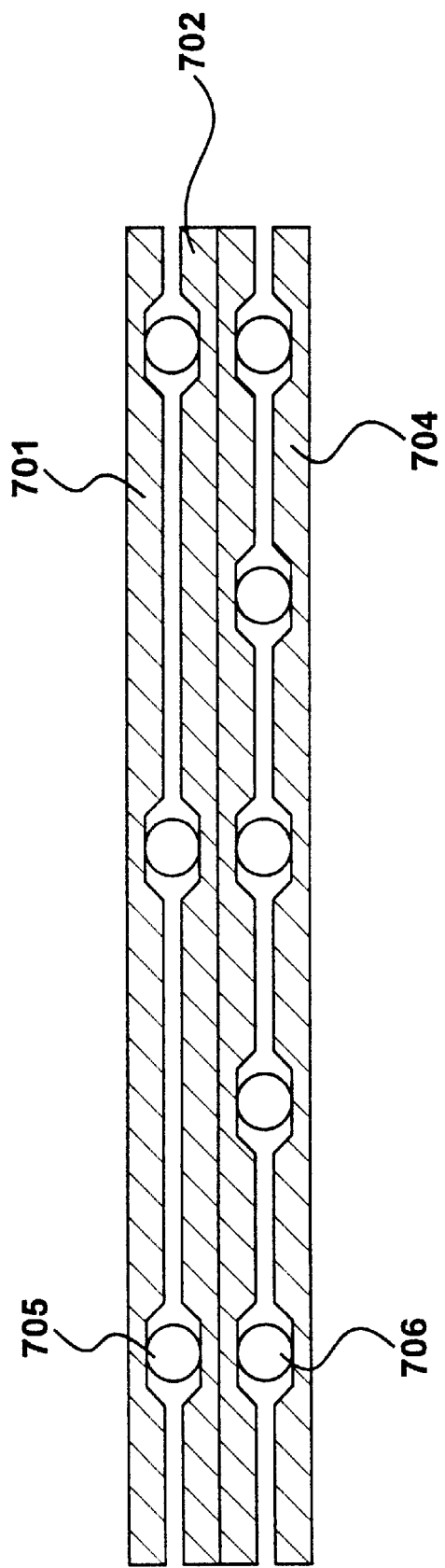
FIG. 7 shows an alternative configuration of conducting planes.
Figure 8:
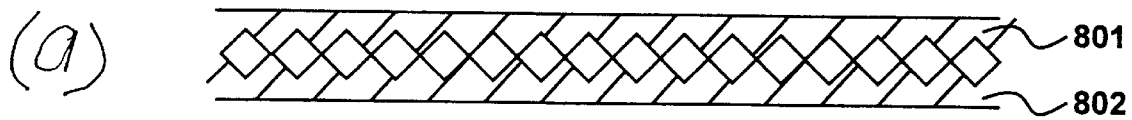
FIGS. 8A–8D show an alternative configuration of conducting planes.
Figure 8:
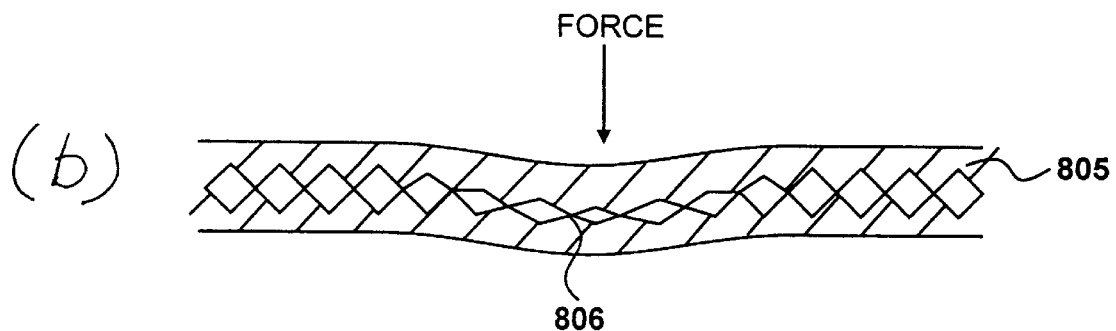
Figure 8:
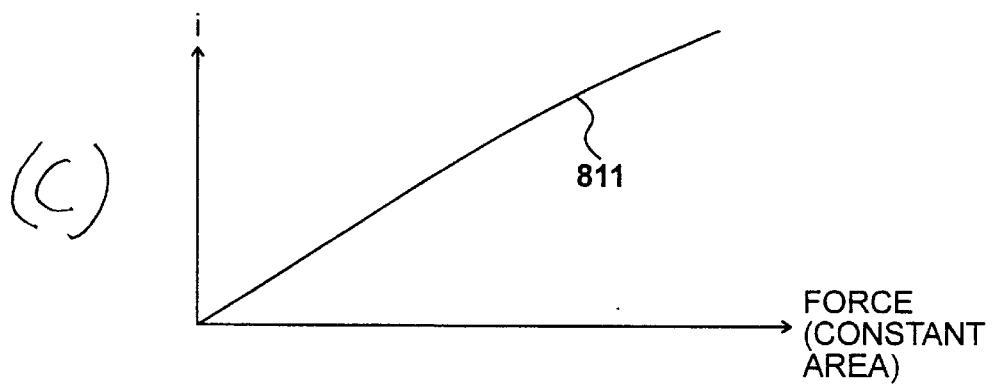
Figure 8:
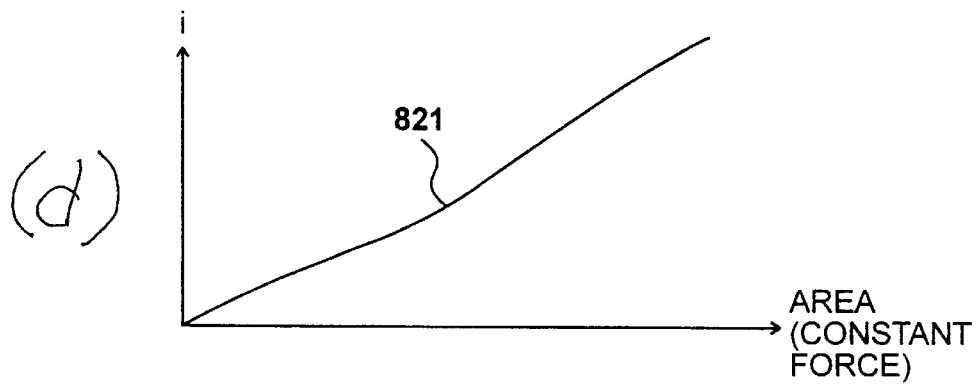
Figure 9:
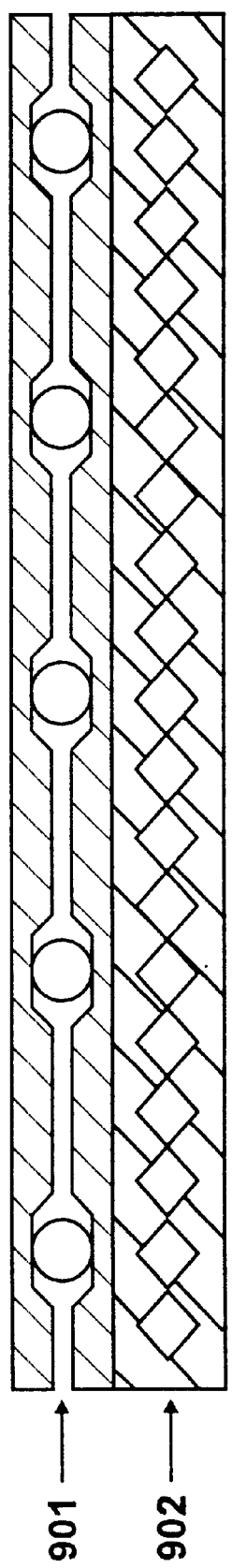
FIG. 9 details a composite configuration of conducting planes.

A composite configuration is shown in FIG. 9, in which a detector 901, substantially similar to that shown in FIG. 6, is combined with a detector 902, substantially similar to that shown in FIG. 9. Detector 901 provides an accurate measurement of applied area and it is relatively unaffected by applied force. Detector 902, as shown in FIG. 8, provides an output which varies with respect to area and force. Thus, by processing the output of these two detectors in combination, it is possible to compensate the output from detector 902 in order to produce values representing force, such that the two currents provide indications of both force and area.

Figure 10:
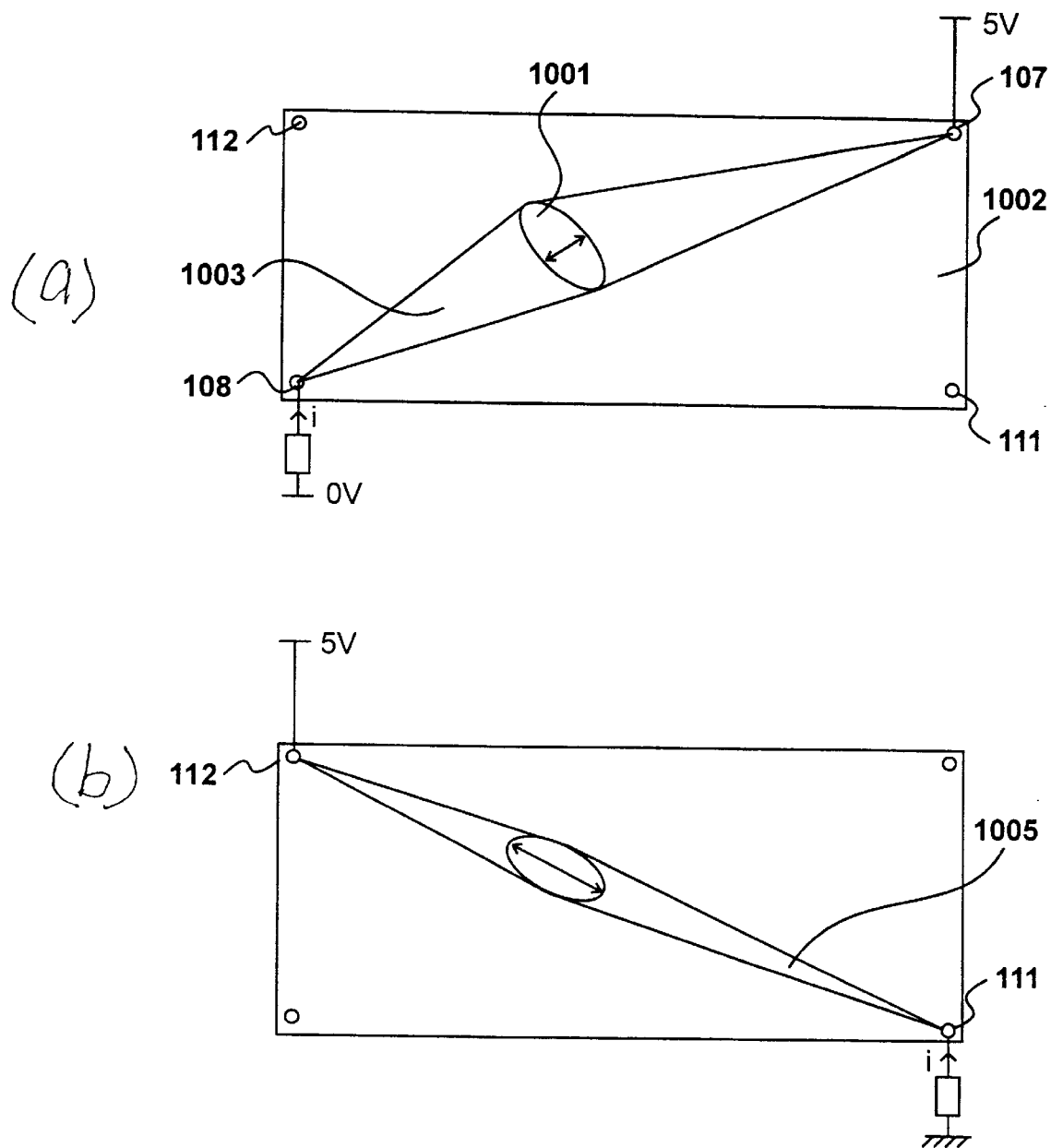
FIGS. 10A–10B show an asymmetric object interacting with conducting planes.

The operation of the control circuit 121 is such as to apply a first voltage across diagonals 107 and 108 with a similar voltage being applied across diagonals 111 and 112. The nature of the voltage distribution is therefore asymmetric, but this does not result in difficulties provided that the area of contact between the two planes is relatively symmetric. However, should an asymmetric area of contact be made, as illustrated in FIGS. 10A and 10B, differences will occur in terms of current measurements when considering calculations made in the two directions.

An asymmetric object 1001 is shown applied to the surface of a detector 1002. When a voltage is applied between contact 107 and 108 (FIG. 10A), paths over which current may flow, illustrated generally at 1003 are relatively large and the object is perceived as having a large area or is perceived as applying a large force. In the opposite dimension, when a voltage is applied between 111 and 112 (FIG. 10B), the regions over which current flow takes place is illustrated generally at 1005, become relatively smaller therefore the object would be perceived as having a relatively smaller area or would be perceived as providing a relatively smaller force.

If the system is programmed to the effect that the object has a constant area and applies a constant force, these differences in terms of current flow may be processed in order to given an indication as to the orientation of the object. Thus, the system of the type illustrated in FIGS. 10A–10B, is used in combination with the detector of the type illustrated in FIG. 9 it is possible to make reference to the parameters of location in two-dimensions, force or pressure, the area of application and orientation.

In the preferred embodiment, electrical characteristics of voltage and current are measured. Alternatively, it would be possible to determine the resistance or the resistivity of the conducting sheets. Problems may be encountered when using alternating currents due to energy being radiated from the conducting sheets. However, in some situations it may be preferable to use alternating currents, in which further electrical characteristics of the detector may be considered, such as capacitance, inductance and reactance etc.

The detector shown in FIG. 1, constructed from conducting planes 102 and 103, operates satisfactorily if the plane of the detector is maintained substantially flat. This does not create a problem in many applications where relatively flat operation is considered desirable. However, although constructed from fabric, thereby facilitating bending and folding operations, the reliability of the detector in terms of its electrical characteristics cannot be guaranteed if the detector planes are folded or distorted beyond modest operational conditions.

Figure 11A:
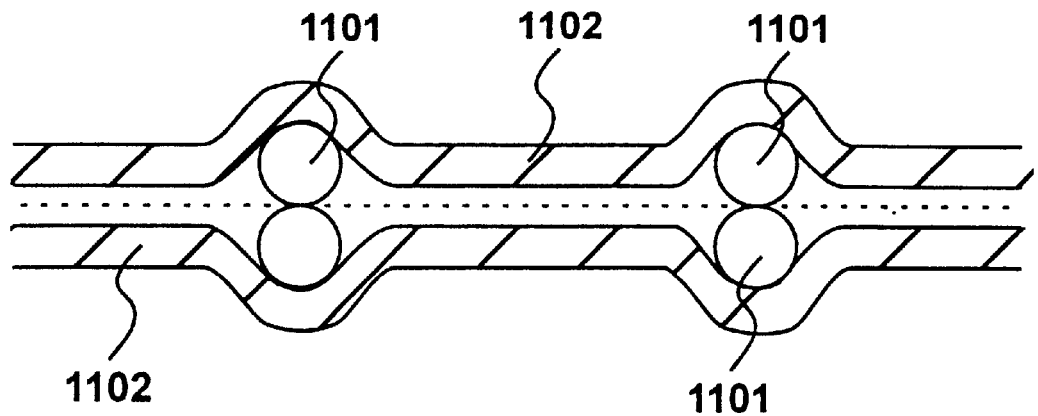
FIG. 11A and FIG. 11B show an alternative construction for a detector.

A detector is shown in FIG. 11A, constructed from fabric having electrically conductive elements to define at least two electrically conductive planes. The detector is configured to produce an electrical output in response to a mechanical interaction, as illustrated in FIG. 1. At least one of the planes includes first portions and second portions in which the first portions have a higher resistance than said second portions and the first higher resistance portions are more flexible that the second portions. In this way, flexing occurs at the portions of high resistance, where contact between the planes has little effect, while the lower resistance portions, where contact does have a strong electrical effect, remain substantially rigid such that the flexing of the material does not occur over these portions of the detector.

Portions 1101 have a relatively high resistance compared to portions 1102. Portions 1101 are not involved in terms of creating an electrical reaction in response to a mechanical interaction. The electrical responses are provided by the more rigid weave of portions 1102. The purpose of portions 1101 is detailed in FIG. 11B. A curvature has been applied to the detector but the configuration is such that normal operation is still possible. The flexing has occurred predominantly at portions 1101. However, portions 1102 have remained straight thereby ensuring that they remain displaced from each other, even when a curvature is present, such that the detector is still available for detecting the presence of a mechanical interaction.

Figure 12A:
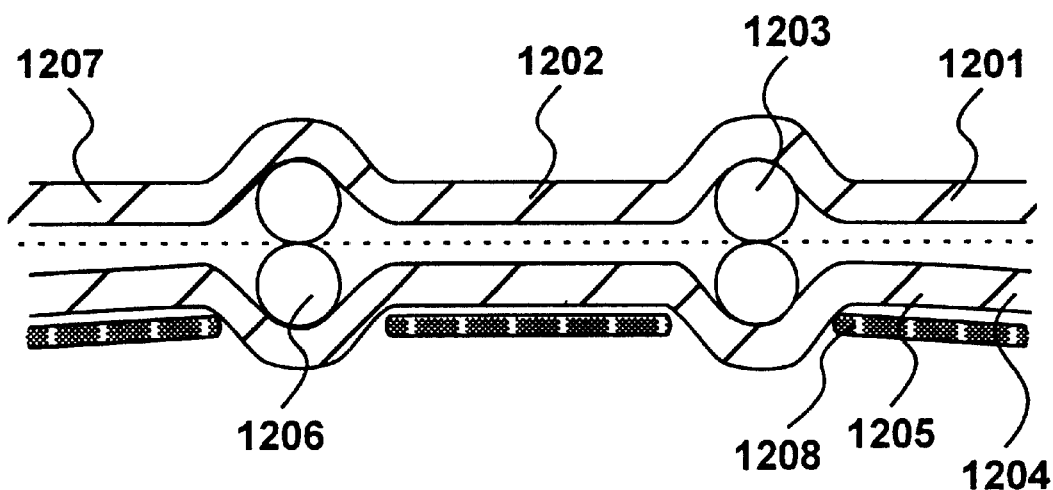
FIG. 12A and FIG. 12B show a further alternative construction.

The rigidity of portions 1102 may be enhanced as shown in FIG. 12A. A first plane 1201 has rigid portions 1202 and flexible portions 1203. A second plane 1204 has relatively rigid portions 1205 and relatively flexible portions 1206. The relatively flexible portions 1206 physically contact against similar portions 1203 in the first plane 1201. In order to ensure that there is no, or at least minimal electrical interaction at these points of contacts, the electrical resistance of the flexible portions 1203 and 1206 is relatively high. A partially insulating layer may be provided between the conducting layers, as shown in FIG. 1. However, the flexible portions 1203 act as insulating separators therefore in this embodiment the provision of a separation layer is not essential. Furthermore, the rigidity of the interacting sections, in terms of the rigid portions 1202 and 1205, has its rigidity further enhanced by the presence of relatively solid intermediate plates 1208.

Figure 11B:
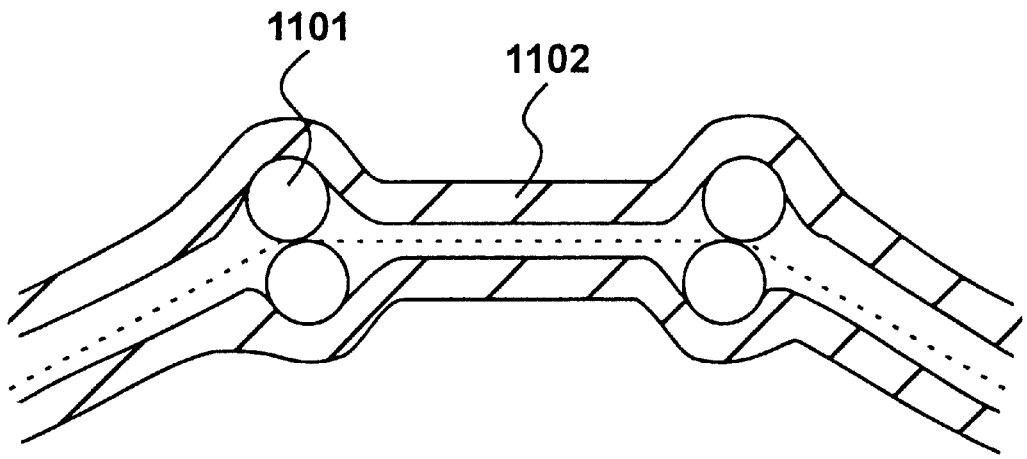
Figure 12B:
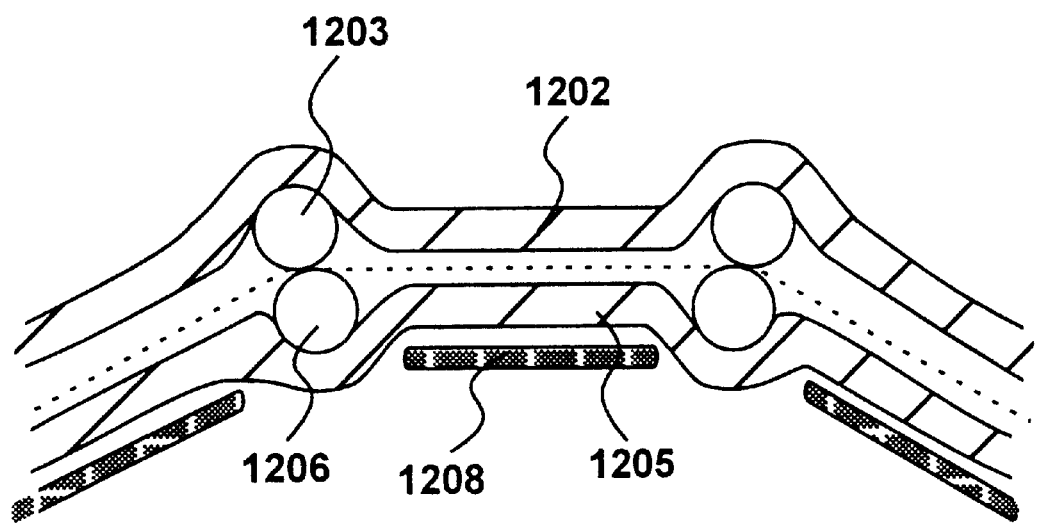

Flexing of the construction shown in FIG. 12A is substantially similar to that provided by the embodiment shown in FIG. 11B. The flexing of the embodiment shown in FIG. 12A is detailed in FIG. 12B. Flexing occurs at the position of the relatively flexible portions 1203 and 1206. The rigidity of portions 1202 and 1205 is enhanced by the provision of more solid plates 1208. Thus, the embodiment shown in FIGS. 12A and 12B may have more strenuous flexing forces applied thereto such that mechanical interaction detection is maintained even under severe operating conditions.

The provision of the flexible portions effectively provide lines over the surface of the conducting planes where folding is permitted. Thus, complex curvatures may be obtained by a number of folds being effected at a plurality of these preferred foldable lines, thereby allowing complex shapes to be attained while maintaining the desired electrical characteristics.

Figure 13:
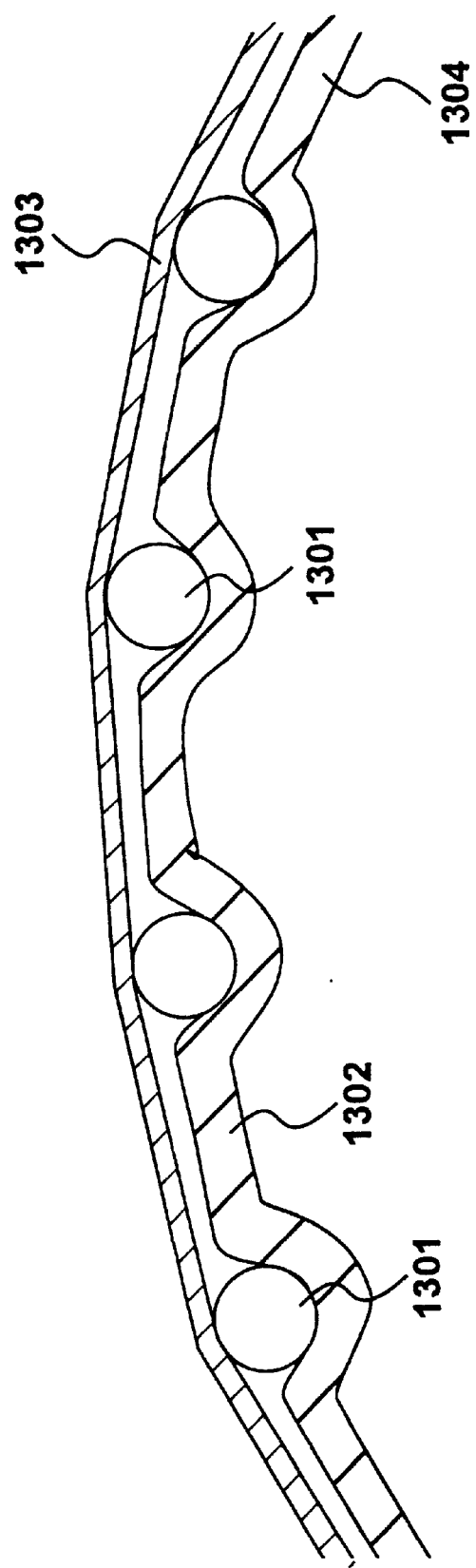
FIG. 13 shows a further alternative construction.
Figure 14:
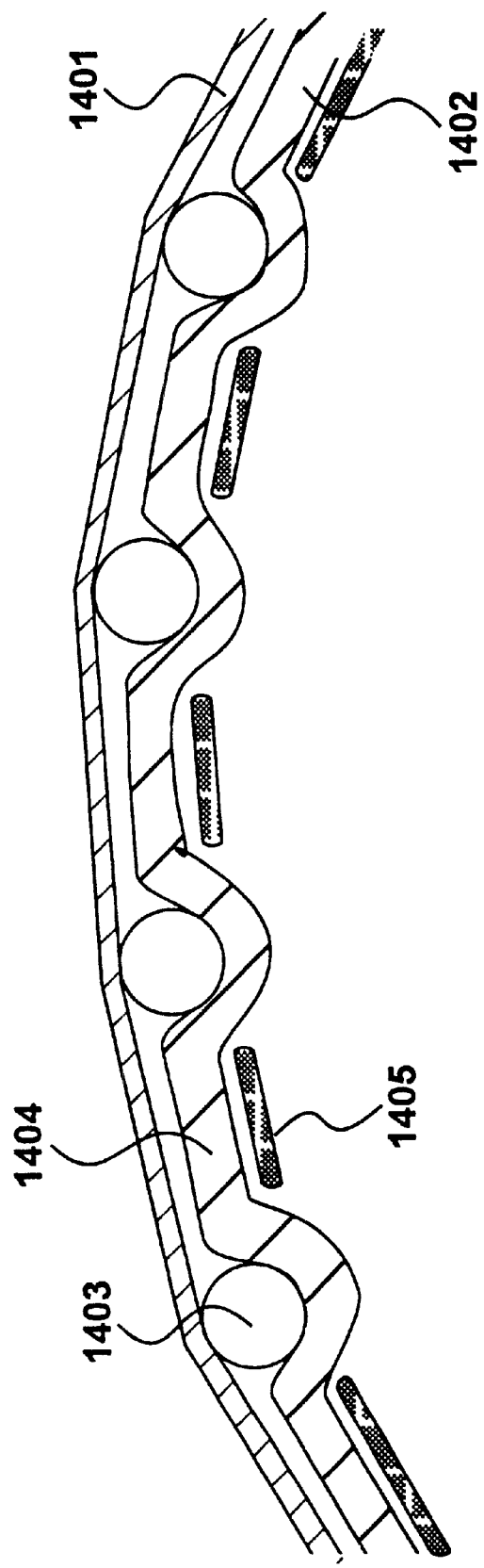
FIG. 14 shows a further alternative construction.

An alternative embodiment is shown in FIG. 13 in which a first co-operating plane has flexible high resistive portions 1301 and rigid conducting portions 1302. This plane co-operates with a second plane 1303 of substantially homogenous construction. Thus, sufficient flexing and insulation is provided by the non-conducting flexible portions 1301 of the lower co-operating plane 1304. The rigidity of conducting portions 1302 may be enhanced in a fashion substantially similar to that provided by FIG. 12A as illustrated in FIG. 14. The device includes an outer plane 1401 of substantially homogenous conducting construction. Below this, there is provided a second co-operating plane 1402 and the two planes may be separated by an insulating layer not shown in the example. The second plane or layer includes flexible non-conducting portions 1403 and more rigid conducting portions 1404, substantially similar to those shown in FIG. 13. In addition, rigid plates 1405 are provided below each rigid portion 1404 thereby significantly enhancing the rigidity of these portions. Thus, the construction in FIG. 14 is capable of withstanding more aggressive working environments compared to the lighter construction shown in FIG. 13. In the construction shown in FIGS. 13 and 14 the outer layers, 1303 and 1401 respectively, are fabricated in a substantially elastic fashion, thereby providing for a stretching or extension of this layer during flexing operations.

The detector shown in FIG. 1 is capable of accurately detecting the position of a mechanical interaction and as previously described, it is also possible to determine other characteristics of the mechanical interaction by modifying other electrical properties. A problem with the detector shown in FIG. 1 is that it experiences difficulties if more than one unconnected mechanical interaction takes place. If a first mechanical interaction were to take place and, simultaneously, a second mechanical interaction were to take place, displaced from the first, it would not be possible, using the configuration shown in FIG. 1, to identify the presence of two mechanical interactions. A condition would be detected to the effect that a mechanical interaction is taking place but the system would tend to perceive this as a single mechanical interaction having characteristics substantially similar to the average of the characteristics of the two independent interactions.

Figure 15:
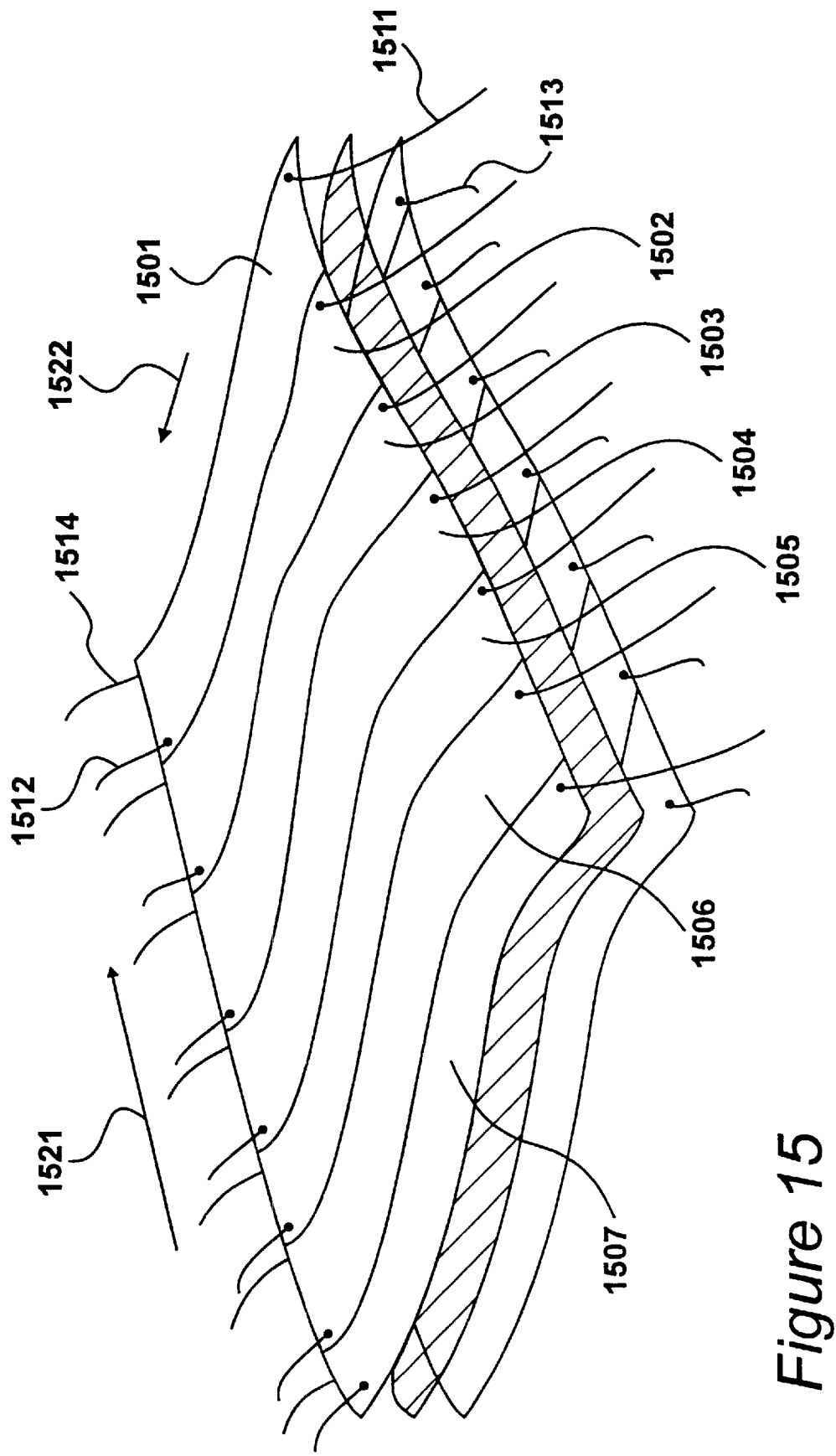
FIG. 15 shows an alternative embodiment having a plurality of detectors.

An alternative embodiment for overcoming problems of this type is shown in FIG. 15. In FIG. 15, a plurality of detectors 1501, 1502, 1503, 1504, 1505, 1506 and 1507 have been connected together and each of these individual detectors has its own unique connectors 1511, 1512, 1513 and 1514. In this way, each of the individual detectors may be connected to its own respective control circuit, such as circuit 121 shown in FIG. 1 or, in an alternative embodiment, a single control circuit of the type shown in FIG. 1 may be shared, using a switching arrangement, between all seven of the individual combined detectors. In this way, each individual detector, such as detector 1501, provides the same level of accuracy as the detector shown in FIG. 1. However, if two or more mechanical interactions take place on different detector sections, it is possible to detect this condition and provide appropriate output responses. However, it is only possible to detect a plurality of mechanical interactions if these interactions take place on different sections and it is not possible for the embodiment shown in FIG. 15 to detect a plurality of interactions if these interactions take place on the same section.

In the arrangement shown in FIG. 15, the detectors have been arranged in strips such that there is enhanced definition in the direction of arrow 1521 but the definition in the direction of arrow 1522 has not changed.

Figure 16:
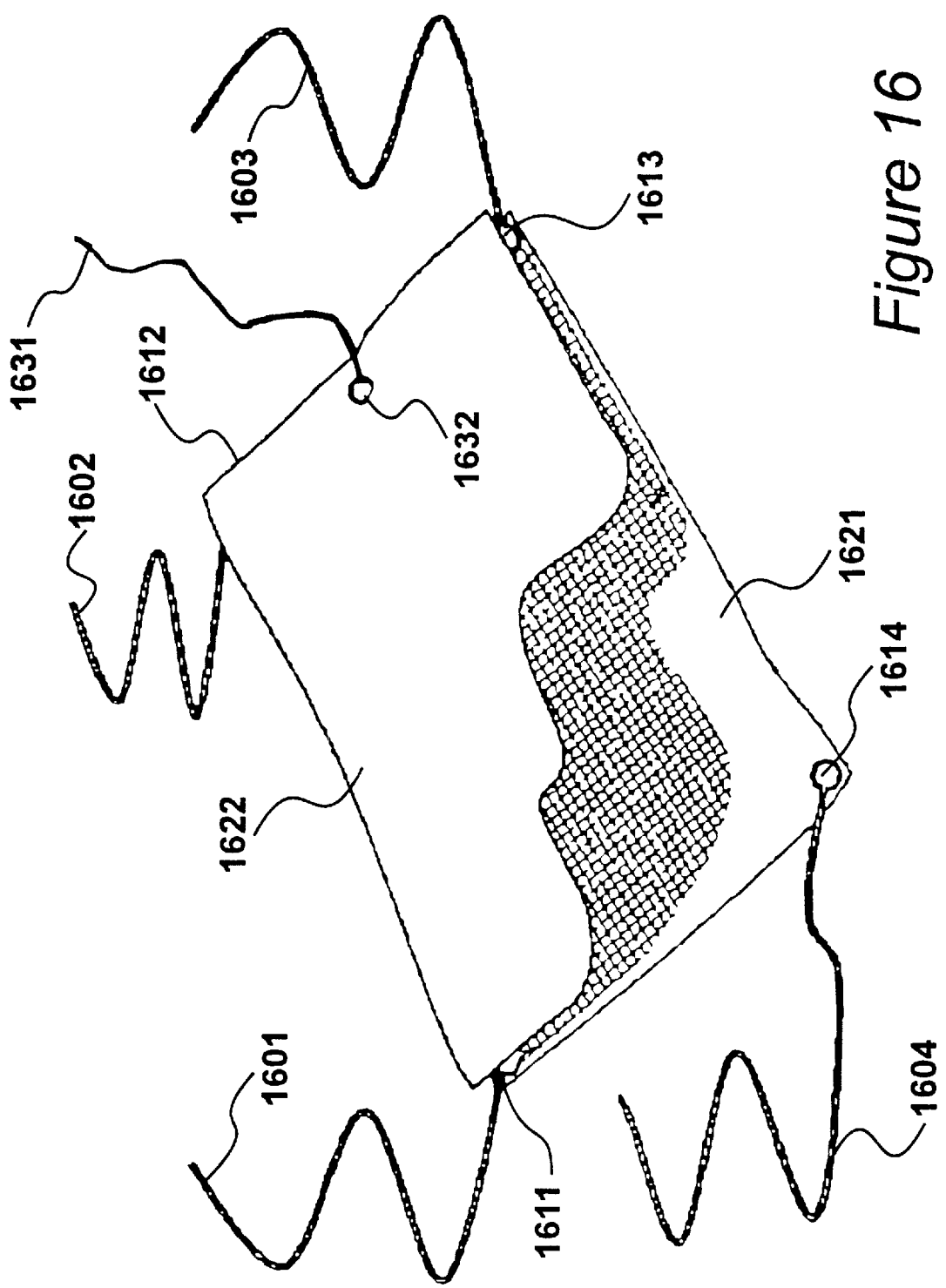
FIG. 16 shows an alternative detector configuration.

In the detector shown in FIG. 1, position detection is made possible using four electrical connection cables, a first two connected to opposing diagonal corners of the upper sheet and a further two connected to the alternative opposing diagonal corners of the lower sheet. An alternative configuration is shown in FIG. 16 in which electrical connectors 1601, 1602, 1603 and 1604 are connected to respective corners 1611, 1612, 1613 and 1614 of a lower plane conducting sheet 1621. An upper plane conducting sheet 1622 is connected to a single detecting cable 1631 connected at a position 1632 towards an edge of upper conducting sheet 1622. A disadvantage of the configuration shown in FIG. 16 is that five separate electrical connections are required whereas only four electrical connections are required in the configuration shown in FIG. 1. However, in some circumstances, the configuration shown in FIG. 16 does have advantages over that shown in FIG. 1.

The configuration shown in FIG. 16 may be used to effectively multiplex the operation of a detector so as to facilitate the detection of a plurality of mechanical interactions to a greater extent than the configuration shown in FIG. 15. In particular, it facilitates detecting multiple mechanical interactions in both dimensions of the planar detector.

As shown in FIGS. 17A and 17B, a lower planar sheet 1701 (FIG. 7A) has connections 1702, 1703, 1704 and 1705 at each of its corners. Thus, sheet 1701 operates in a way which is substantially similar to the operation of sheet 1621 and all output voltages are generated within this sheet, either across diagonal 1702 to 1704 or across diagonal 1703 to 1705, thereby giving a two-dimensional co-ordinate within the area of the sheet.

An upper planar sheet 1721 (FIG. 17B) is divided into a plurality of portions, in the example shown, eight portions 1731 to 17389 are provided. Thus, the mechanical action results in conducting planes of at least one of said regions being brought into electrical interaction with the lower plane 1701. Furthermore, if a mechanical interaction occurs at region 1731 and a second mechanical interaction occurs at region 1735 (for example) both of these mechanical interactions may be determined independently and an output to this effect may be generated by a processing system, such as system 131.

In order to achieve the space division multiplexing provided by regions 1731 to 1738, time division multiplexing of the electrical signals is performed in which, during each individual time slot, one individual region 1731 to 1738 is considered. This is achieved by each individual region 1731 to 1738 having its own respective electrical connector 1741 to 1748. These connectors are preferably incorporated in to the structure of the sheet.

Figure 17:
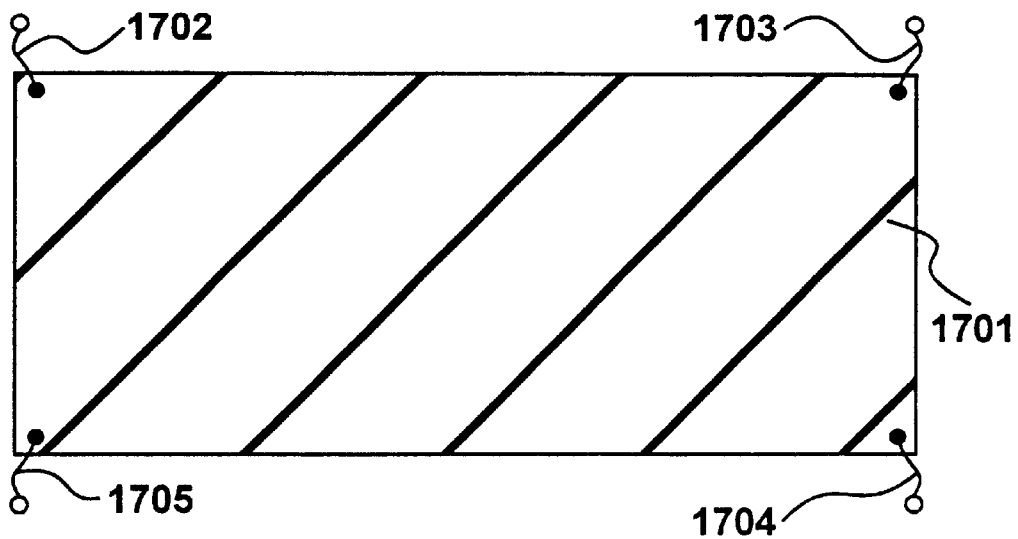
FIGS. 17A–17B show multiple detectors of the type shown in FIG. 16.
Figure 17:
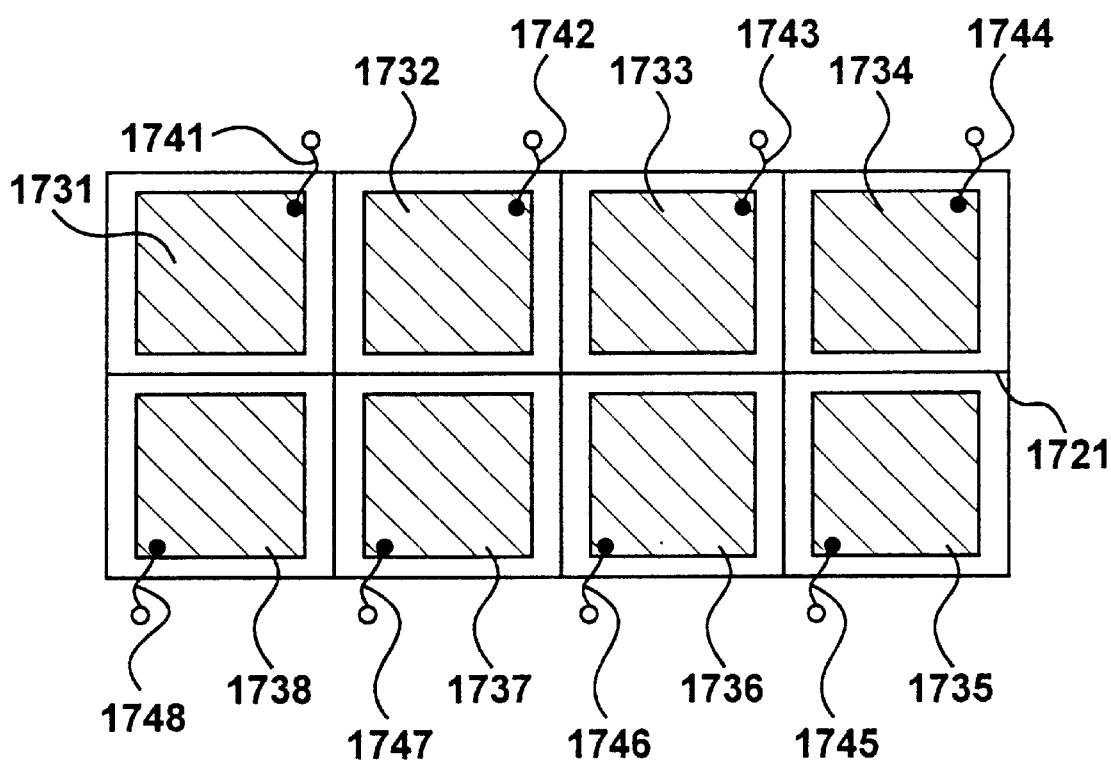

Control circuitry for the configuration shown in FIG. 17 requires modification compared to that shown in FIG. 2. In particular, each of the eight output control lines 1741 is supplied to its own respective buffering amplifier, similar to amplifiers 222 and 223 and the output from each of these eight amplifiers is applied to appropriate switching devices, allowing one of eight inputs to be selected using a plurality of switches substantially similar to switch 221.

A complete scanning cycle consists of applying a voltage between input terminals 1702 and 1704. An output is then considered from each individual output terminals 1741 to 1748. The voltages are then reversed such that a voltage is applied between output terminals 1705 and 1703. Each of the individual input terminals is then considered again so as to provide two-dimensional co-ordinates within each of the individual regions 1731 to 1748. As described with respect to FIG. 2, both voltages and currents may be considered in order to provide additional mechanically related information, such as pressure related information etc.

In the detector configuration shown in FIG. 1 and in alternative detector configurations, such as that shown in FIG. 15 and that shown in FIG. 16, it is necessary to provide electrical connection between processing equipment and the detector fabric itself. Techniques for the addition of electrical connectors to current conveying fabrics are known. However, in the known techniques, continual wear and usage of the detector assembly often results in electrical connectors becoming disconnected from the material fabric, resulting in total system failure. It is therefore highly desirable to provide a system in which the electrical connector is held very securely to the material fabric itself so as to provide a robust system which does not become disconnected through continual use.

Figure 18:
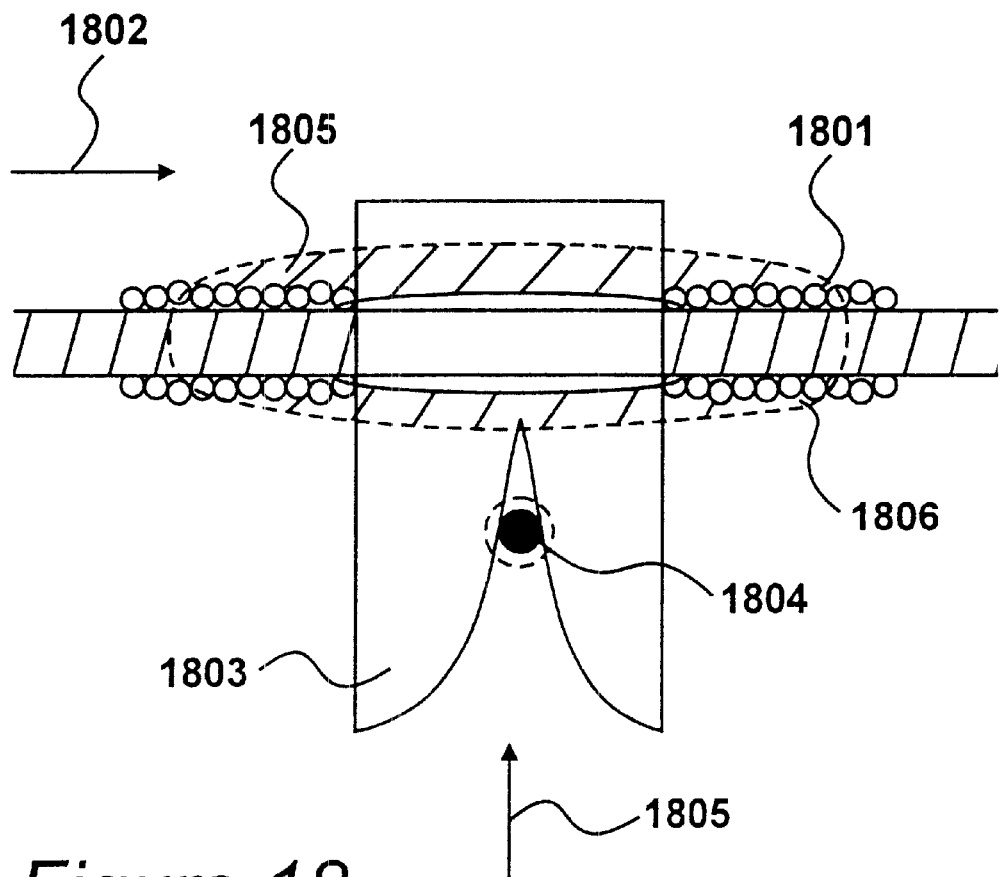
FIG. 18 shows a first embodiment in which a connector has been included during the machining process.
Figure 19:
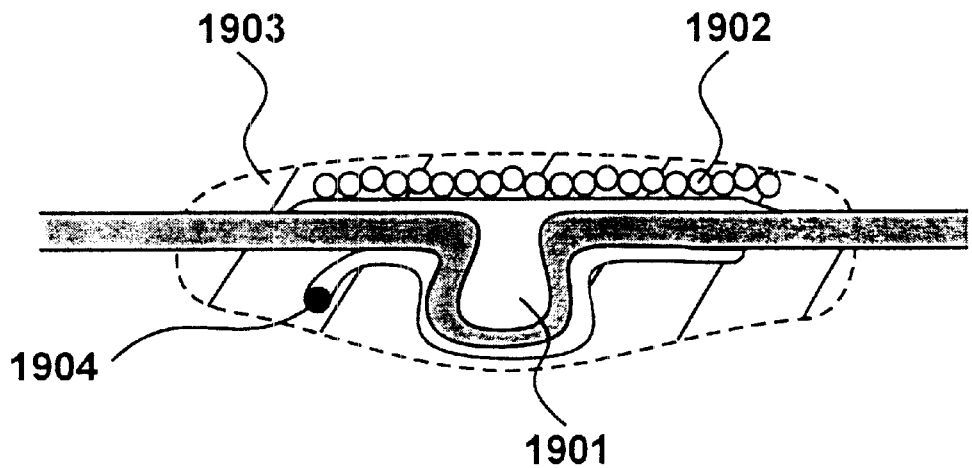
FIG. 19 shows an alternative embodiment in which a connector has been added during a machining process.

An improved approach to providing electrical connection to the electric current carrying conductors within the fabric is illustrated in FIG. 18. Further modification is shown in FIG. 19. In both of these systems, the fabric is constructed from electrically conducting fibres and from electrically insulating fibres by a mechanical process, such as weaving or knitting. An improved electrical connection is achieved by connecting electrical connection devices to the electrically conducting fibres of the fabric forming the detector during the mechanical fabric generating process. Thus, in the embodiments shown in FIG. 18 and FIG. 19, there is no requirement for adding connectors after a fabric has been created. The provision of a connector to the electric current carrying fibres is achieved during the actual mechanical process itself. Thus, for example, if the fibres are being produced by a knitting operation, part of this knitting operation involves procedures by which the electrical current carrying connector is actually included as part of the overall knit.

Fibres 1801 making up the weave are illustrated in FIG. 18. A weaving procedure may be considered as generating woven fabric by traversing in the direction of arrow 1802. At pre-programmed positions, or at manually selected positions, modifications are made to the weaving process to the effect that a connector 1803 is to be introduced.

In the example shown in FIG. 18, connector 1803 is an insulation displacement connector (IDC) allowing an insulated wire to be connected in such a way that it is not necessary to remove the insulation from the wire, given that the insulation is effectively cut as the wire, illustrated by reference 1804 is inserted into the connector in the direction of arrow 1805.

The weaving procedure is modified such that connector 1803 is included as part of the weave and is thereby held relatively firmly after the weaving procedure has been completed. In order to provide a further enhanced mechanical connection between electrical connector 1803 and the remaining woven fabric, additional layers of electrically conducting epoxy resin 1805 and 1806 are applied, such that, in operation, physical force applied to connector 1803 will not, under normal circumstances, displace connector 1803 from the woven material of the device and electrical integrity of the device will be maintained.

A similar configuration is shown in FIG. 19 in which a rivet fastener 1901 is applied during a weaving or knitting process, thereby substantially embedding the rivet fastener within the overall weave or knit. After the rivet fastener has been secured by the woven fabric 1902, electrically conducting epoxy resin 1903 is applied to provide enhanced mechanical and electrical stability.

In the configuration shown in FIG. 1 and in the configuration shown in FIG. 16, an electrical field is established over the transmitting plane. Given a plane of infinite size, the electrical field would have a regular geometric distribution and the position of a mechanical interaction could be determined from two voltage measurements in a substantially straightforward way. However, in the configuration shown in FIG. 1 and FIG. 16, edges are present and these edges introduce severe distortions to the nature of the electric field from which measurements are being taken. In the control circuit 121 and within the data processing system 131 it is possible to provide a level of compensation, possibly in response to empirical measurements but such an approach has disadvantages, one of which being a loss of resolution.

Figure 20:
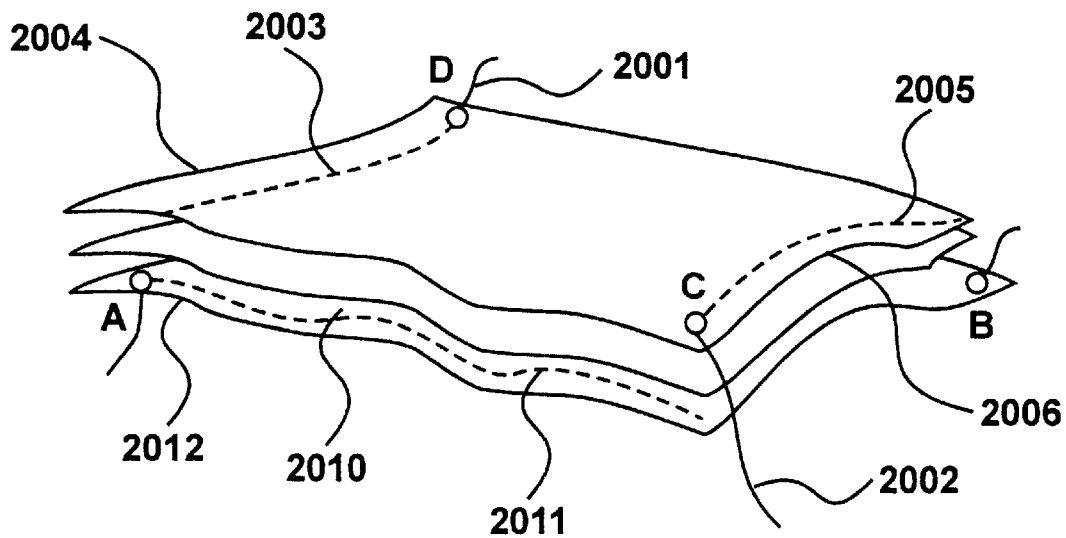
FIG. 20 shows a detector constructed from fabric having a conductivity non-uniformity.
Figure 21:
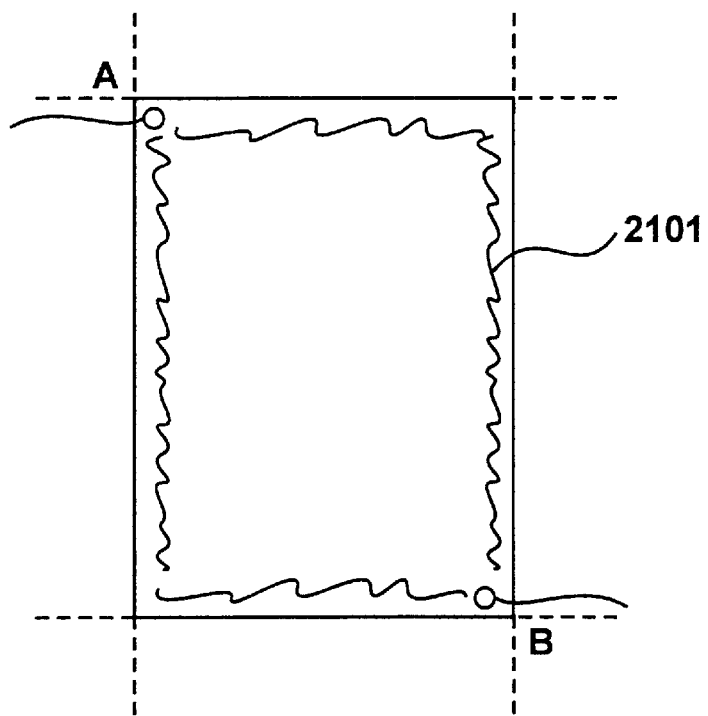
FIG. 21 shows an alternative embodiment with a conductivity non-uniformity.

Systems are shown in FIGS. 20 and 21 in which a detector is constructed from fabric having electrically conductive elements to define at least two electrically conducting planes. The detector is configured to produce an electrical output in response to a mechanical interaction. The relationship between mechanical interaction and electrical output is enhanced by introducing a conductivity non-uniformity which is included in at least one of the planes so as to modify an electrical response to the mechanical interaction.

In FIG. 20, an electrical connector 2001 is connected to a plane at a first corner and a second connector 2002 is connected to the diagonally opposing corner. A configuration of this type could be used for a detector of the type shown in FIG. 1, in which the electrical field effectively traverses across the diagonal corners, resulting in distortions at the edges. In the embodiment shown in FIG. 20, a conducting thread 2003 with relatively low resistivity is included across edge 2004, electrically connected to connector 2001. Similarly, a second conducting thread 2005, with relatively low resistivity, extends from electrical connection 2002 along edge 2006. In this way, the whole of edge 2004 becomes conducting and the whole of edge 2006 becomes conducting. The resulting electric field is then substantially linear throughout the length of the detector thereby substantially eliminating non-linear edge effects.

In its co-operating plane 2010 a low resistance conducting thread 2011 is included along edge 2012 and a similar conducting thread is provided along the opposing edge. In this way, the electric field traverses in a direction which is orthogonal to the electric field provided in the upper sheet, thereby allowing co-ordinates defined in mutually orthogonal co-ordinate space.

A conducting material is shown in FIG. 21 in which areas 2101, close to all four edges, have had their conductivity modified, such that the overall conductivity of the sheet is non-uniform. This modification to conductivity may be achieved in several ways, including the addition of a conducting thread of the type illustrated in FIG. 20. Alternatively, the modification to conductivity, to provide conductivity non-uniformity, may be achieved by a printing operation in which electrically conducting inks, possibly including silicon, are printed at region 2101. Alternatively, the density of conducting fibres in the woven material itself may be modified towards the edges of the detector, again resulting in a conductivity non-uniformity. Furthermore, it should be appreciated that modifications of this type may be achieved using combinations of the above identified effects in order to tailor the required level of non-uniformity for a particular application.

In the configuration shown in FIG. 1, a cycle is performed in which upper plane 102 effectively transmits allowing signals to be received by lower plane 103. A co-ordinate position is identified by reversing the operation of these planes, such that certain parts of the cycle include situations in which the lower plane 103 is effectively transmitting and the upper plane 102 is effectively transmitting. In a configuration of this type, it is preferable for the material types to be similar so as to provide substantially similar operations when plane 102 is transmitting or when plane 103 is transmitting. This is a particularly important constraint when the system is being used to measure current flow, given that different resistivities could be achieved in the different directions of current flow.

In the configuration shown in FIG. 16, transmission always occurs from plane 1621, although in different orientations, and detection always occurs from plane 1622. With a configuration of this type, current always flows in the same direction therefore it is not essential for planes 1621 and 1622 to have equivalent mechanical constructions.

In the configuration shown in FIG. 16, a detector is constructed from fabric having electrically conductive elements to define at least two electrically conductive planes and configured to produce an electrical output in response to a mechanical interaction. A second electrically conductive plane, such as plane 1622 of the detector, has at least one electrical characteristic that differs significantly in value from the value of said characteristic of the first plane 1621.

In the detector shown in FIG. 16, the upper receiving plane 1622 has a significantly lower resistance than the lower transmitting plane 1621. In this way, as the area of mechanical interaction increases, the amount of current flow increases significantly, thereby improving the definition of the system with respect to changes in the size of the mechanical interaction, and allowing for less intensive calculations when determining force etc.

What is claimed is:

1. A detector constructed from fabric having electrically conductive elements and configured to produce electrical outputs in response to mechanical interactions, wherein
   said detector is divided into a plurality of regions;
   each of said regions includes a first conducting plane and a second conducting plane configured such that, in use, a mechanical interaction results in conducting planes of at least one of said regions being brought closer together; and
   a potential is applied across at least one of said planes to identify said at least one region and to determine a position of mechanical interaction within said region.

2. A detector as in claim 1, wherein a first conducting plane is unique to a region and a second co-operating conducting plane is shared with a plurality of regions.

3. A detector as in claim 2, wherein the second conducting plane is a single co-operating conducting plane which is shared with all of said regions.

4. A detector as in claim 1, wherein signals are derived independently from a plurality of regions by a time division multiplexing operation.

5. A detector according to claim 1, wherein, in use, a potential is applied across at least one of said planes to determine the position of the mechanical interaction and a second electrical property is determined to identify additional properties of said mechanical interactions.

6. A detector as in claim 5 configured to measure current or resistance as said second electrical property.

7. A detector as in claim 5 configured to determine applied force, applied pressure, area of contact or orientation of an object as the additional property of said mechanical interactions.

8. A detector as in claim 1 wherein at least one of said planes includes first portions and second portions, said first portions have a higher resistance than said second portions and said first higher resistance portions are more flexible than said second portions.

9. A detector as in claim 8 wherein said higher resistance portions are configured as flexible portions to facilitate rotational movement about similar portions in a co-operating conductive plane.

10. A detector as in claim 8 wherein said second portions are further supported by solid portions.

11. A detector as in claim 10 wherein said solid portions are constructed from rubber, silicon or plastics.

12. A method of constructing a detector from fabric having electrically conductive elements and configured to produce electrical outputs in response to mechanical interactions, said method comprising:
    dividing the detector into a plurality of regions; providing a first conductive plane and a second conductive plane for each of said regions and configuring said planes such that, in use, at least one of said regions of said first and second conductive planes are brought together in response to a mechanical interaction and a potential is applied across at least one of said planes to identify said at least one region and to determine a position of mechanical interaction within said region.

13. A method of constructing a detector as in claim 12 wherein a first conducting plane is unique to a region and a second co-operating conducting plane is shared with a plurality of regions.

14. A method as in claim 13 wherein the second conducting planes is a single co-operating conducting plane which is shared with all of said regions.

15. A method as in claim 12 wherein at least one of said planes includes first portions and second portions, said portions have a higher resistance than said second portions and said first higher resistance portions are more flexible than said second portions.

16. A method as in claim 15, wherein said higher resistance portions are configured as flexible portions to facilitate rotational movement about similar portions in a co-operating conductive plane.

17. A method as in claim 12 wherein said second portions are further supported by solid portions.

18. A method as in claim 17 wherein said solid portions are constructed from rubber, silicon or plastics.

19. A method of determining the position of a mechanical interaction using a detector constructed from fabric having electrically conductive elements configured to produce outputs in response to mechanical interactions, and said detector is divided into a plurality of regions, each of said regions including a first and second conducting plane such that, in use, a mechanical interaction results in conducting planes of at least one of said regions being brought closer together, wherein said method includes:

applying a potential across at least one of said planes to identify said at least one region and to determine a position of mechanical interaction.

20. A method of determining the position of a mechanical interaction as in claim 19 wherein a second electrical property is determined to identify additional properties of said mechanical interactions.

21. A method of determining the position of a mechanical interaction as in claim 19 wherein signals are derived independently from a plurality of regions by a time division multiplexing operation.

* * * * *